US009305351B2

(12) United States Patent
Partain

(10) Patent No.: US 9,305,351 B2
(45) Date of Patent: Apr. 5, 2016

(54) METHOD OF DETERMINING THE PROBABILITIES OF SUSPECT NODULES BEING MALIGNANT

(71) Applicant: Larry D. Partain, Los Altos, CA (US)

(72) Inventor: Larry D. Partain, Los Altos, CA (US)

( * ) Notice: Subject to any disclaimer, the term of this patent is extended or adjusted under 35 U.S.C. 154(b) by 244 days.

(21) Appl. No.: 13/918,981

(22) Filed: Jun. 16, 2013

(65) Prior Publication Data

US 2014/0369582 A1 Dec. 18, 2014

(51) Int. Cl.
*G06K 9/00* (2006.01)
*G06T 7/00* (2006.01)

(52) U.S. Cl.
CPC ..... *G06T 7/0014* (2013.01); *G06T 2207/10081* (2013.01); *G06T 2207/20076* (2013.01); *G06T 2207/30064* (2013.01)

(58) Field of Classification Search
None
See application file for complete search history.

(56) References Cited

U.S. PATENT DOCUMENTS

| | | | |
|---|---|---|---|
| 6,567,684 B1 * | 5/2003 | Chenevert et al. | 600/410 |
| 7,492,858 B2 | 2/2009 | Partain et al. | |
| 8,036,435 B2 | 10/2011 | Partain et al. | |
| 8,049,156 B2 | 11/2011 | Partain et al. | |
| 8,320,518 B2 | 11/2012 | Partain et al. | |
| 2011/0201917 A1 * | 8/2011 | Li et al. | 600/410 |
| 2012/0082359 A1 * | 4/2012 | Arditi et al. | 382/131 |
| 2013/0071333 A1 | 3/2013 | Partain et al. | |
| 2013/0071334 A1 * | 3/2013 | Partain et al. | 424/9.4 |
| 2014/0369582 A1 * | 12/2014 | Partain | 382/131 |

OTHER PUBLICATIONS

L. Micklesfield et al, ("Dual-Energy X-Ray Performs as Well as Clinical Computed Tomography for the Measurement of Visceral Fat") Obesity (2012) 20, 1109-1114.

George Zentai ("Signal-to-Noise and Contrast Ratio Enhancements by Quasi-Monochromatic Imaging") IEEE Trans. on Instrumentation and Measurement Mar. 2011, vol. 60 Issue 3. pp. 908-915.

Carl J. Tiderius et al, ("Gd-DTPA2—Enhanced MRI of Femoral Knee Cartilage: A Dose-Response Study in Healthy Volunteers") Magnetic Resonance in Medicine 46:1067-1071 (2001).

J. Pintaske, ("Relaxivity of Gadopentetate Dimeglumine (Magnevist), Gadobutrol (Gadovist), and Gadobenate Dimeglumine (MultiHance) in Human Blood Plasma at 0.2, 1.5, and 3 Tesla") Investigative Radiology • vol. 41, No. 3, Mar. 2006.

A. Bashir, ("Nondestructive Imaging of Human Cartilage Glycosaminoglycan Concentration by MRI") Magnetic Resonance in Medicine 41:857-865 (1999).

* cited by examiner

*Primary Examiner* — Tahmina Ansari
(74) *Attorney, Agent, or Firm* — William Nuttle

(57) ABSTRACT

Methods of determining a probability of a suspect cancer nodule being malignant are provided. In one embodiment, the method begins with tabulating histogram data of malignant and benign nodules as a function of biomarker values for a specified patient population suspect of having a specific type of cancer. Next, the tabulated histogram data is separated into a plurality of biomarker bins where the bins are ranges of biomarker values, and malignancy probability fractions are calculated for each biomarker bin by dividing a number of true positives in each marker bin by a summed total of all true and false positives in each bin. Finally, a suspect nodule in a patient is scanned, a biomarker value for the suspect nodule determined, and a malignancy probability for the suspect nodule determined by reference to the tabulated histogram data and the malignancy probability fractions. Other embodiments are also disclosed.

20 Claims, 22 Drawing Sheets

METHOD OF DETERMINING THE PROBABILITIES OF SUSPECT NODULES BEING MALIGNANT

TECHNICAL FIELD

The present invention relates specifically to malignant cancer nodule detection as a function of biological marker values, and more generally to a method of determining the true positive probabilities of marker identified features for a more general but specified population of interest.

BACKGROUND

Detection and treatment of cancer in early stages of tissue malignancy generally leads to a favorable result. In contrast, misdiagnosis and in particular a false positive diagnosis, often leads to unnecessary further testing and/or treatment that can be costly and harmful, resulting in pain and mental anguish for the patient.

The conventional approach to diagnosing suspect regions as lesions or nodules and ascertaining whether they are benign or malignant generally begins with imaging the suspect region using a non-invasive medical imaging technique. Examples of such imaging techniques include X-ray based techniques, such as computer aided tomography (CT) scans, and magnetic resonance imaging (MRI) scans. Inflamed tissues express stress hormones that induce the rapid but porous growth of capillaries to the inflammation site to assist healing. Poorly differentiated cancer lesions tend to grow initially without supporting capillaries. They come under stress for lack of nutrient delivery and waste removal (e.g. glucose and CO, respectively). The stress hormones emitted also result in porous capillary formations which leak contrast agents, such as iodine for CT scans and Gadolinium (Gd) for MRI scans, injected into the patient prior to performing the scan. The contrast enhanced images and other data from the scan is then evaluated by a trained clinician who provides a subjective assessment based on the visual inspection of whether the nodules are likely benign or malignant requiring further testing, such as a biopsy, or treatment. As already noted such testing can be time-consuming, costly and can be quite painful and result in mental anguish for the patient.

Accordingly, there is a need for a method of predicting the likelihood of a suspect nodule being malignant at early stage in testing to avoid unnecessary further testing or treatment. There is a further need for method of evaluating images and/or data that utilizes quantitative and numerical marker values to accurately screen and diagnose cancer nodules in patients, thereby reducing the need for subjective evaluation by highly trained and experienced professionals. It is further desirable that the method is capable of being automated.

SUMMARY

Methods of determining a probability of a suspect cancer nodule in a patient being malignant are provided.

In a first aspect or embodiment, the method begins with tabulating histogram data of malignant and benign nodules as a function of biomarker values for a specified patient population suspect of having a specific type of cancer, where biomarker values comprise mean concentrations of a contrast agent in the nodules. Next, the tabulated histogram data is separated into a plurality of biomarker bins where the bins are ranges of biomarker values, and malignancy probability fractions are calculated for each biomarker bin by dividing the number of true positives in each marker bin by the summed number of true and false positives tabulated histogram data in each bin. Finally, a suspect nodule in a patient is scanned, a biomarker value for the suspect nodule determined, and a malignancy probability for the suspect nodule determined by reference to the tabulated histogram data that determine the true positive fractions and the true positive probability fractions.

Preferably, the method further includes calibrating a scanning system used for scanning the suspect nodule in the patient to be substantially linear across a range of biomarker values indicating malignancy probabilities typically of from 0 to 90% (at least for breast and lung nodules).

In one version of this embodiment, the contrast agent includes Iodine and the biomarker values includes mean changes in Hounsfield Units (HU) (with minus without contrast) or mean Iodine concentrations ($I_c$) for each of the nodules obtained by calibrated translations of mean HU changes into mean Iodine concentrations ($I_c$). A biomarker value (either mean HU changes or Iodine concentration), for the suspect nodule in the patient can be determined by: (i) injecting a contrast agent including iodine into the patient; and (ii) performing a computed tomographic (CT) scan of the suspect nodule before and after injection and determining mean changes in Hounsfield Units (HU) values or the calibrated Iodine concentration for all voxels in a CT image of the nodule; and (iii) interpreting the mean HU change or the mean iodine concentration biomarker values as a malignancy probability for the suspect nodule.

Alternatively, in another embodiment the contrast agent includes Gadolinium (Gd) or a Gadolinium containing compound such as Gadolinium-Terephthalic acid (Gd-TPA), and the biomarker values include mean MRI analog-to-digital (ADC) count changes (with minus without Gd) or mean Gd or Gd-TPA concentrations, from calibrations of the mean ADC count changes for different Gd concentrations, for each of the nodules. A biomarker value (either mean changes in ADC counts or mean Gd concentrations) for the suspect nodule in the patient can be determined by: (i) injecting a contrast agent including gadolinium into the patient; (ii) performing a magnetic resonance imaging (MRI) scan of the suspect nodule before and after Gd injection and determining mean ADC count changes or calibrated mean Gd concentration values for all voxels in the MRI images of the suspect nodule; and (iii) translating these mean biomarker values into a malignancy probability for the suspect nodule.

The method is effective for predicting malignancy for nodules in breast tissue, lung tissue, and where the suspected type of cancer is of some other cancer type such at colorectal, kidney, liver, pancreas, brain, pleura etc.

In another aspect or embodiment, the method includes constructing malignancy probability diagrams. In one version of this embodiment, the method begins with tabulating histogram data of malignant and benign nodules as a function of biomarker values for a specified patient population suspect of having a specific type of cancer to generate a measured histogram, where biomarker values comprise mean concentrations of a contrast agent in the nodules or mean changes in HU values for CT or mean changes in ADC counts for MRI, where change means with-minus-without the contrast agent. Next, a Gaussian approximated histogram is generated from the measured histogram, and a malignancy probability diagram that represents a probability that a suspect nodule having a specified biomarker value would be found to be malignant if biopsied is generated from the Gaussian approximated histogram and the biomarker values. Then, a suspect nodule in a patient is scanned, a biomarker value for the suspect nodule determined, and a malignancy probability for the suspect nodule determined by reference to the malignancy probability diagram.

In yet another aspect, the method includes a computer implemented method of determining that a suspect nodule in a patient is malignant. In one embodiment, the method begins with tabulating histogram data of malignant and benign nodules as a function of biomarker values for a specified patient population suspect of having a specific type of cancer, where biomarker values comprise mean concentrations of a contrast agent in the nodules or mean changes in HU values for CT or for mean changes in ADC counts for MRI. Next, the tabulated histogram data is separated into a plurality of biomarker bins where the bins are ranges of biomarker values, and malignancy probability fractions are calculated for each biomarker bin by dividing the number of true positives in each marker bin by a summed number true and false positives of tabulated histogram data in each bin. Finally, diagnostic data pertaining to a biomarker value for the suspect nodule in a patient is received in the computer, and a malignancy probability for the suspect nodule determined by reference to the tabulated histogram data and the malignancy probability fractions.

BRIEF DESCRIPTION OF THE DRAWINGS

These and various other features of methods of determining the probabilities of suspect nodules being malignant will be apparent upon reading of the following detailed description in conjunction with the accompanying drawings and the appended claims provided below, where:

DETAILED DESCRIPTION

The present invention is directed to methods of determining the probabilities of identified suspect nodules being malignant for a specified patient in an identified and malignancy characterized population.

Figure 1:
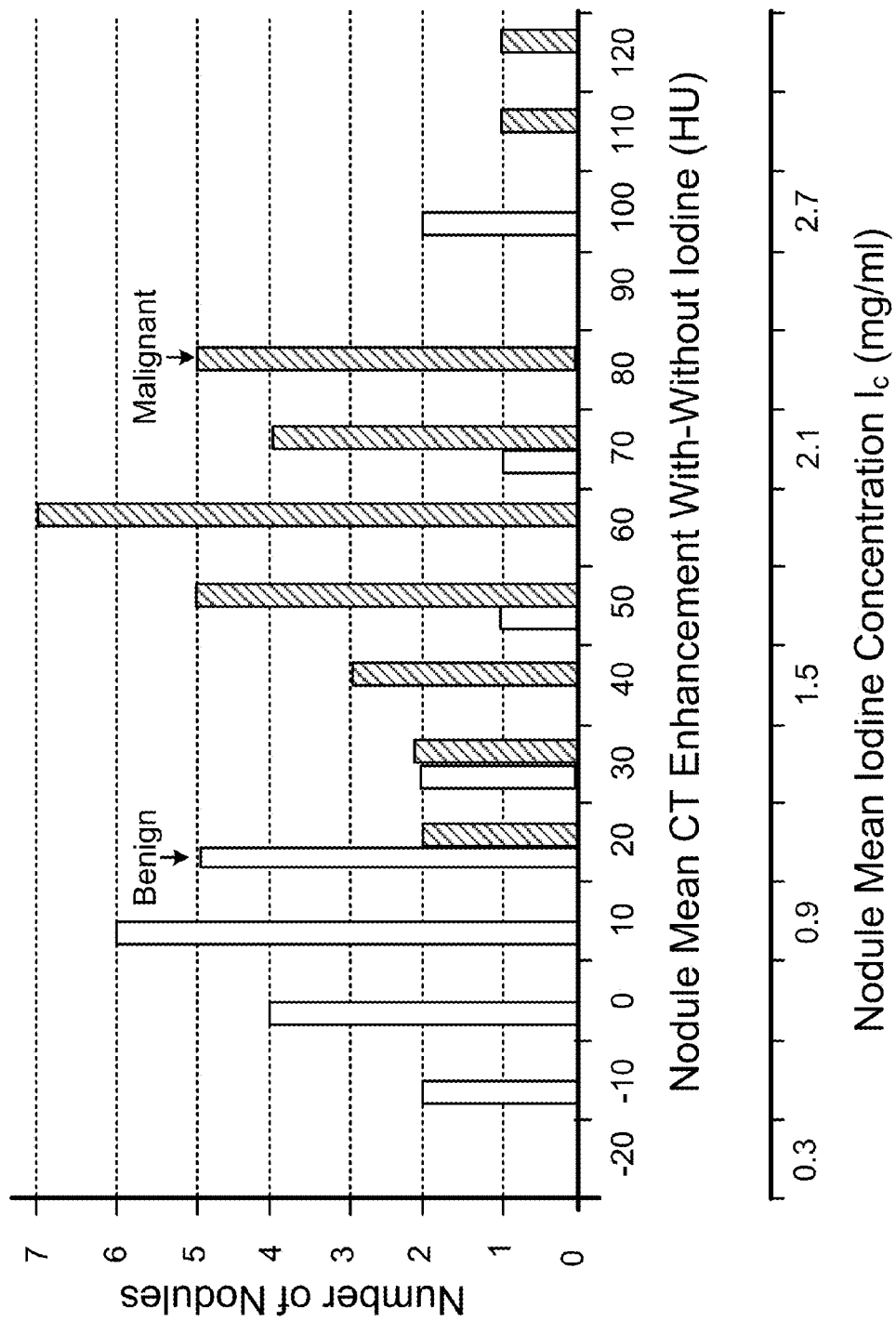
FIG. 1 is a measured histogram of suspect nodules in breast tissue for a specified patient population.

In a first embodiment, the method is described with reference to a patient population typically screened for breast cancer and classified as BIRADS 4 or 5 (the two top most levels for patients with the highest probabilities for having malignant breast cancer). These levels are assigned using the standardized BIRADS "pattern recognition" methods of the American College of Radiology for breast cancer screening based on two view X-ray mammography images. The method begins with a measured histogram of suspect nodules in breast tissue for samples from a specified patient population illustrated by FIG. 1. Referring to FIG. 1, mammography imaging identified 52 suspect breast nodules that were biopsied. The fraction of the 52 suspect nodules that biopsy determined to be malignant was 0.56. This malignant population fraction is also called prevalence. The ground truth of whether a suspect nodule was malignant or benign was determined from biopsy and based on histopathology. The vertical axis of FIG. 1 is the number of such nodules versus the changes in mean computed tomography (CT) enhancement (shown as the horizontal axis) in HU units due to the use of an iodine contrast agent. These mean HU enhancements changes were determined from cone beam CT (CBCT) images taken before and after iodine contrast enhancement.

Figure 2:
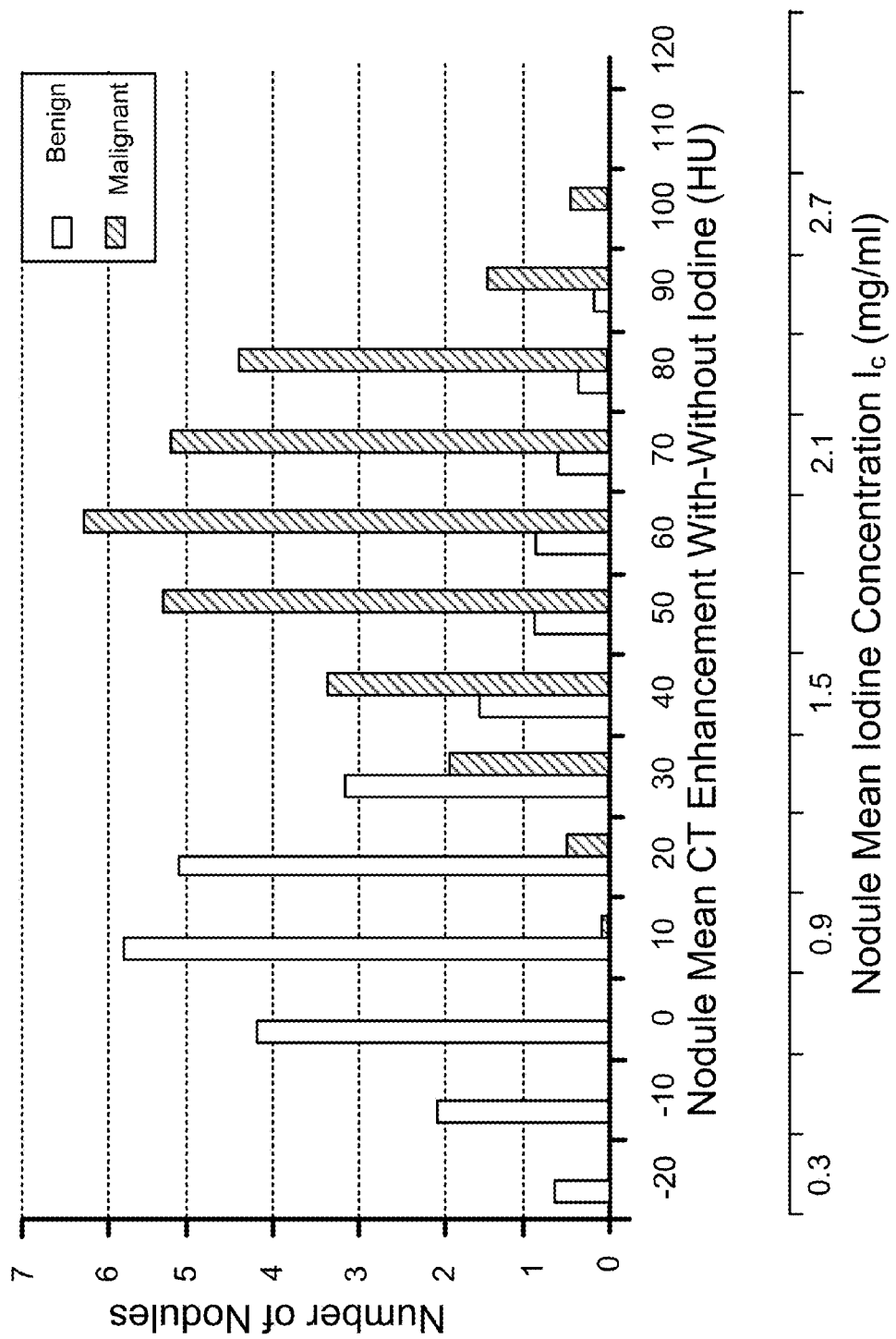
FIG. 2 is a Gaussian approximated histogram of suspect nodules measured histogram of FIG. 1.

Performing Receiver-Operator-Characteristic (ROC) analyses of histogram data discussed below from a small sample of nodules (52 in total as shown in FIG. 1) gives erratically shaped ROC curves due essentially to under sampling of the patient population. However the standard practice is to approximate the histogram by replacing the measured data with Gaussian shaped curves with the same mean and standard deviation values. FIG. 2 is a Gaussian approximated histogram of the data shown in the FIG. 1 according to an embodiment of the present invention.

Standard Gaussian distributions have an area-under-curve value of 1.0 which was normalized in FIG. 2 so that the data total was the same 52 total sum value as in FIG. 1. This conversion causes the fractional data values of FIG. 2 instead of the integer number values of FIG. 1. Note that there actually 3 distributions in FIG. 1. The first is the benign distribution on the left but the data to the right are composed of both malignant and benign lesions. The latter benign ones are so low in number that their mean and standard deviation values were difficult to determine so they were assumed to be the same mean and standard deviation as the malignant ones on the right. The Gaussian normalization process made these benign approximation totals be the same and total of 4 shown on the right of FIG. 1. This accounts for the long tail of benign lesions on the right side of FIG. 2. In essence this Gaussian approximation technique is a smooth curve fitting process for converting the noisy experimental histogram distributions of FIG. 1 into smoothed histogram distributions of FIG. 2. It just one of multiple possible ways of fitting noisy experimental histograms with smoothed fits that facilitate better interpretation of clinical results. However it is a fitting process particularly applicable to cases of random sampling of data.

This long benign distribution tail is due to inflammation, the mechanism that cancer disease exploits to convert a natural process for healing into a disease process that supports cancer development. Inflamed tissues express stress hormones that induce the rapid but porous growth of capillaries to the inflammation site to assist healing. Poorly differentiated cancer lesions tend to grow initially without supporting capillaries. They come under stress for lack of nutrient delivery and waste removal (e.g. glucose and $CO_2$ respectively). The stress hormones emitted also result in porous capillary formations all of which leak contrast agents like iodine. Thus preferential contrast enhancement can occur in both benign and malignant tissues.

Figure 3:
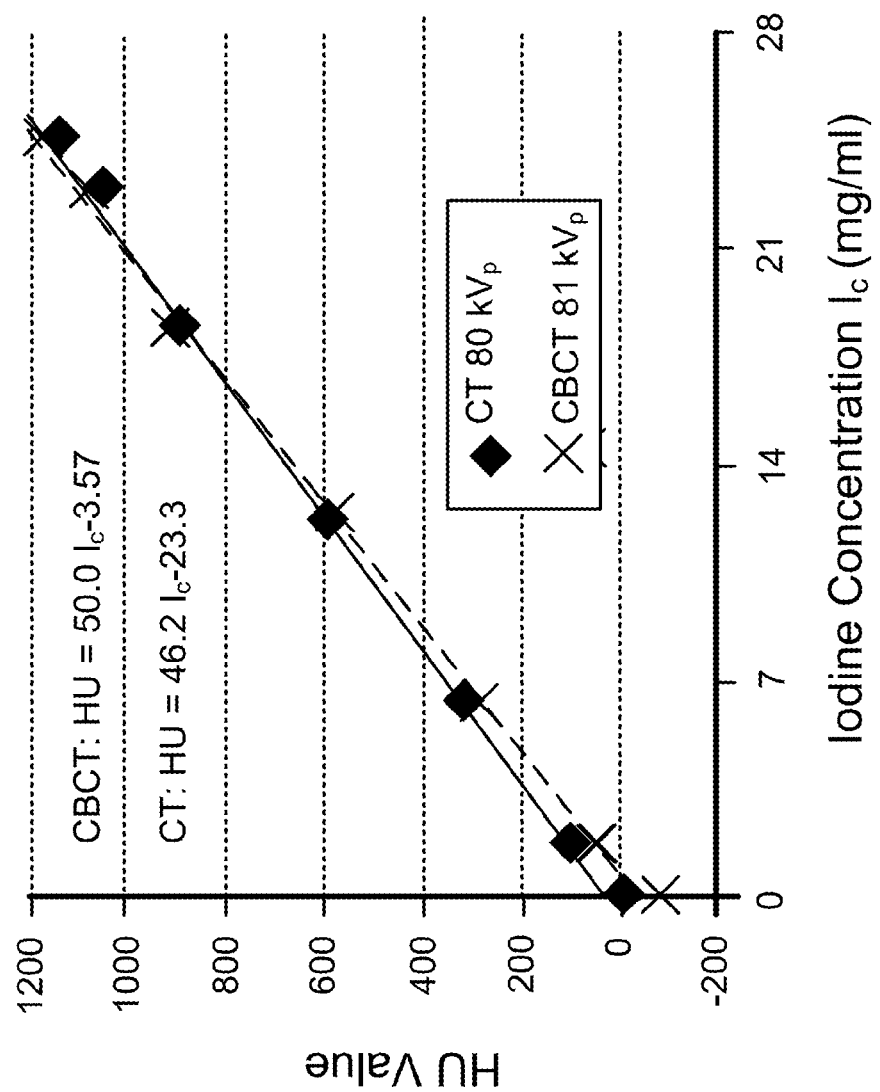
FIG. 3 is a graph of illustrating calibration of a computed tomography (CT) system for actual iodine concentrations ($I_c$) present in benign and malignant nodules versus Hounsfield Unit (HU) values, according to an embodiment of the present invention.

The Gaussian approximated histogram of FIG. 2 is the actual starting point for the novel and new malignancy probability determination methods of the present invention. However before describing this new method it is useful to note that the changes in CT number enhancement of suspect nodules due to iodine enhancement can be calibrated in terms of the actual iodine concentrations $I_c$ present in benign and malignant nodules and expressed in mg/ml. The results of such calibration processes are shown in FIG. 3 for both multi-slice helical Computed Tomography (CT) and for cone beam CT (CBCT). FIG. 3 is a graph of illustrating calibration of a CT system for actual iodine concentrations ($I_c$) present in benign and malignant nodules versus changes in Hounsfield Unit (HU) values. To calibrate the CT system small bottles were filled with homogeneous iodine contrast solutions diluted in water to a known concentration values. These bottles were then placed in body phantoms and x-ray CT systems and imaged with CT number determinations to provide the data points. The most important thing to note is that these data points are well fit with linear straight lines for the limited HU ranges of −20 to 120 HU and the limited iodine contrast concentration ranges of 0 to 12 mg/ml relevant to the conditions considered here. Specific linear equations for the straight line calibration fits of these data are shown in the upper left hand corner of FIG. 3. Solving the top CBCT equation for $I_c$ in terms of the HU values of CT numbers provides the HU conversions to $I_c$ values shown on the horizontal axes of both FIGS. 1 and 2. Here, the CBCT calibration curve taken at 81 kVp was used since they had the closest conditions to the 80 kVp CT data shown in FIG. 1. Note that this proper calibration process replaces the changes in CT number enhancement values of FIGS. 1 and 2 that can go negative with corresponding $I_c$ values that are all positive as one expects for "enhancement".

Figure 4:
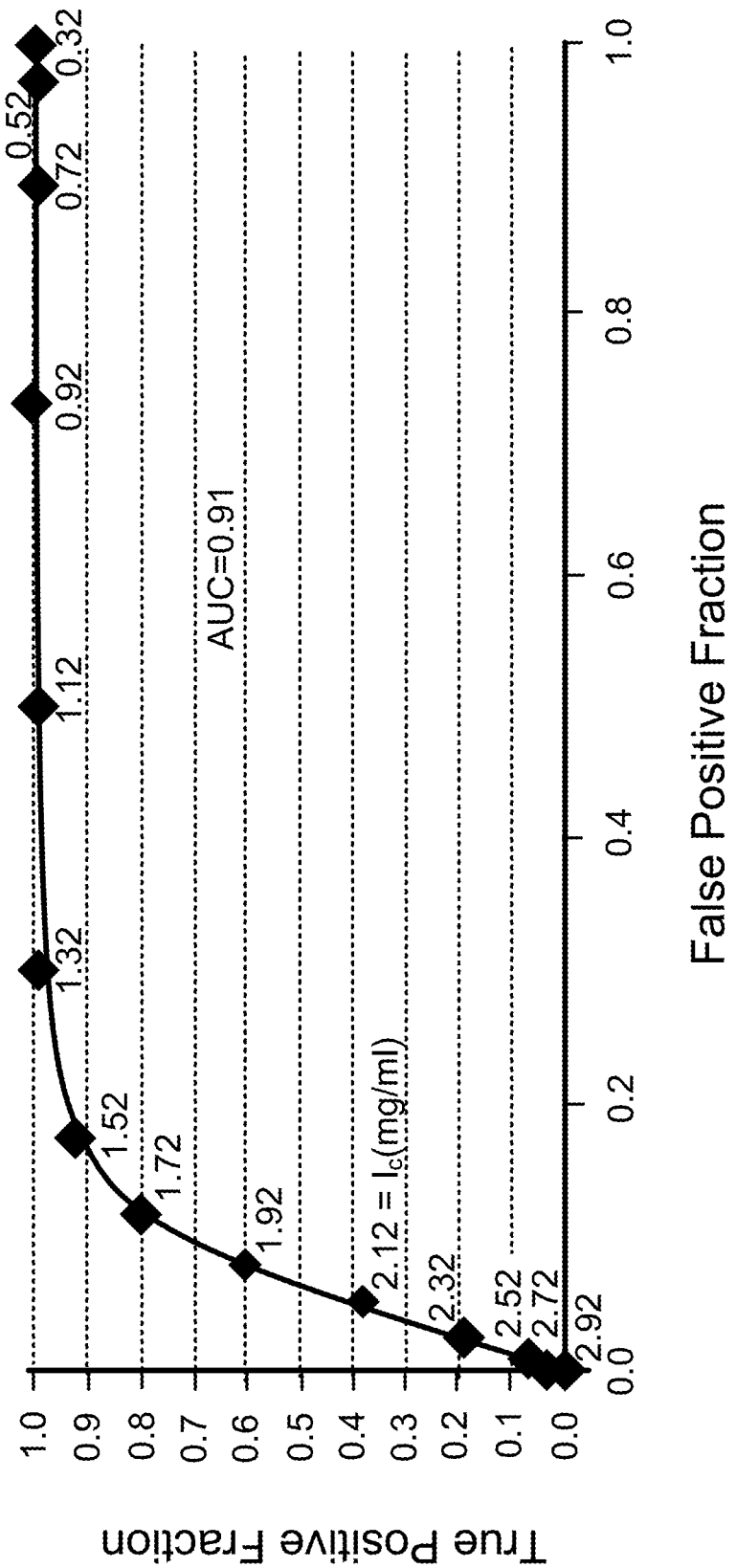
FIG. 4 is a receiver operator characteristic (ROC) curve of true positive fractions versus false positive fractions for the population sample of 52 lesions from FIG. 1, annotated with mean Iodine concentration ($I_c$) for each nodule, according to an embodiment of the present invention.

Next a method is described for taking the Gaussian histogram data of FIG. 2 and in two steps converting iodine concentrations $I_c$ into malignancy probabilities. The first is to plot the FIG. 2 data into the standard ROC curve of true positive fractions versus false positive fractions, annotated with mean Iodine concentration ($I_c$) for each nodule for the suspect nodules of FIG. 2, as shown in FIG. 4. Here each data point is annotated with the $I_c$ threshold concentration of iodine used to determine each true positive and false positive fraction data points of FIG. 4. For the $I_c$ threshold value of 0.3 mg/ml of FIG. 2, if one considers all nodules with $I_c$ of that value or higher, one can see this includes all of the benign nodules and all of the malignant nodules for the 100% inclusion of all false negatives and all true positives. This is the top right (1.0, 1.0) data point in FIG. 4. As one increases this $I_c$ threshold from 0.3 to 0.9 mg/ml, one eliminates the false positives (i.e. the benign nodules) down to a ~0.8 false positive fraction with no loss in true positives (i.e. malignancies). However it one continues past 0.9 mg/ml for the threshold, one begins to lose the true positives as shown by the successive data point of FIG. 4. If one continues to raise the threshold to 3.0 mg/ml there are no more nodules left and the true positive and false positive fractions both drop to zero as indicated by the final data (0.0, 0.0) point at the lower left of FIG. 4. It is rare for ROC curves to have their data points annotated with characterization threshold values being used to generate this curve. However this annotation allows one to immediate compare the FIG. 2 histogram and the ROC curve of FIG. 4 and immediately understand how one simply generates the latter from the former. If one had a perfect case where the FIG. 2 histogram had no overlap of benign and malignant nodules versus $I_c$ values, then 0% inclusion of false positives could be maintained as true positive (malignant nodules) increase to 100%. The latter perfection corresponds to an Area-Under-Curve (AUC) of 1.0. Thus the 0.91 AUC of FIG. 4 indicates a high level of performance and of substantial value for this process.

Figure 5:
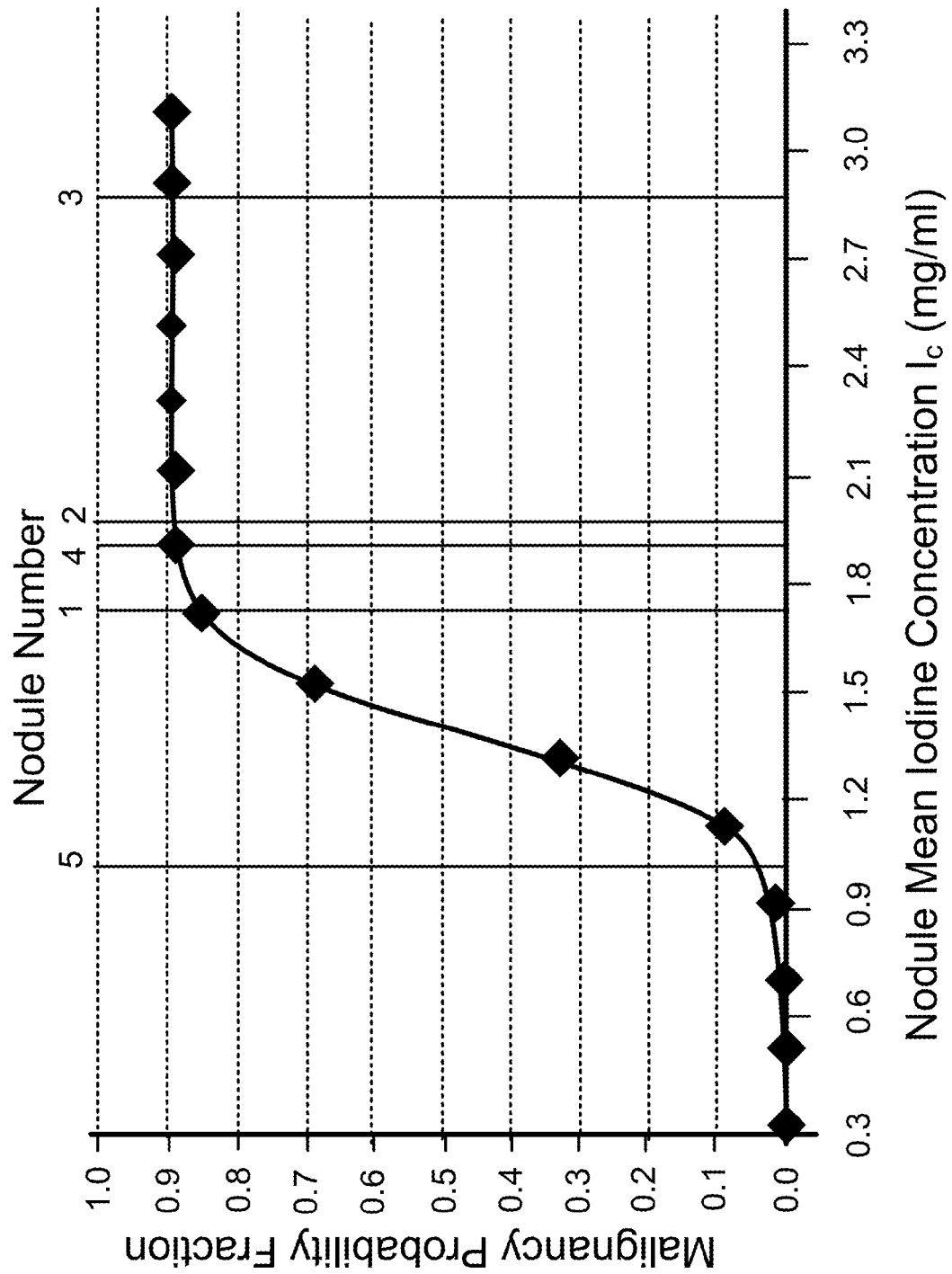
FIG. 5 is a malignancy probability diagram representing the probability that the suspect nodules in breast tissue are malignant for a given mean iodine concentration, according to an embodiment of the present invention.

FIG. 5 is a malignancy probability diagram representing the probability that the suspect nodules in BIRADS 4 and 5 patients' breast tissue are malignant, according to an embodiment of the present invention. Here the FIG. 2 data are again plotted as a function of the same $I_c$ mean iodine concentration in mg/ml. But now the vertical axis is the fraction of nodules in any one histogram Ic-value-bin that are malignant. Upon reflection one can understand that this FIG. 5 fraction represents the probability that a nodule of a specified mean $I_c$ value would be found to be malignant if biopsied, to the extent that the FIG. 2 histogram (Gaussian approximated from the small population sample) accurately describes the designated whole patient population being considered. Note from FIG. 2, that this malignancy probability fraction remains zero until one increases $I_c$ above 0.9 mg/ml as also indicated in FIG. 5. As this is raised further, the malignancy probability rapidly rises to it maximum 0.9 value for $I_c$ values of 2.0 mg/ml and above.

It reaches a maximum at the 0.9 level because of the benign inflammation lesions that underlie the malignant distribution. The assumption of a Gaussian shape with the same standard deviation guarantees that the asymptote is the high constant fraction value of less than 1.0. Particularly note that $I_c$ is a physical quantitative metric that contrasts sharply with the subjective, pattern recognition techniques applied to many cancer diagnosis cases discussed below. Also note that the Gaussian is a continuous function implying that the $I_c$ mg/ml metric is indeed a continuous variable with physical and probabilistic meaning for any nodules with any specific mean $I_c$ values. And finally, note that going from FIG. 2 to FIG. 5 is indeed a one step process that does not require the intermediate FIG. 4 annotated ROC curve step. The intermediate step was included to better relate the current advance to the prior ROC art below.

In another embodiment an Iodine contrast agent is injected into the patient, and an x-ray CT scan of a suspect nodule performed. The biomarker values for the suspect nodule are then determined by obtaining the mean iodine concentrations after iodine contrast injection from the changes in mean HU values of voxels obtained from use of two different X-ray energy distribution data acquisitions using calibration expressions obtained from body phantom measurements. A significant advantage here is that there is no substantial wait between CT data set acquisitions. Both are done after contrast injection and if interleaved they can essentially be taken simultaneously.

In a further embodiment a Gd contrast agent is injected into the patient and a MRI scan of a suspect nodule performed. The biomarker values for the suspect nodule are then determined by obtaining the mean Gd concentrations after Gd contrast injection from the mean ADC counts of voxels obtained from the MRI data acquisition via calibration expressions. This is a trade-off of simpler implementation using a single post contrast MRI data acquisition that greatly simplifies data analysis but at the potential cost of lower accuracy compared to two MRI scan acquisitions, one before and the other after Gd contrast injection.

Although the method of the present invention has been described above in considerable detail with respect to a CT or CBCT scan using an iodine contrast agent, it will be appreciated that other non-invasive medical imaging techniques and/or different contrast agents can be used without departing from the spirit and scope of the present invention.

For example, in one embodiment the imaging techniques include magnetic resonance imaging (MRI) scans using a contrast agent including gadolinium (Gd). Three dimensional imaging with Gd-MRI shows a similar concentration enhancement due to the leaky vasculature of cancer lesions to that found with iodine contrast enhanced CT. An advantage of MRI (versus X-rays) is that the imaging is acquired with no ionizing radiation dose. The well-known non-linearity of MRI signal levels as a function contrast agent concentrations such as Gd has frustrated many attempts to obtain quantitative results. However the procedures of the present invention only require approximately linear behavior over the small mean ADC count differences for after-versus-before the contrast injection that can readily be translated into Gd concentrations using calibrations. In the case of X-ray CT and iodine contrast concentrations, such as that shown in FIG. 5 and FIG. 10A described below, illustrate that linearity over 0.3 mg/ml or 1.0 mg/ml in the breast and lungs respectively are required for this new process where the malignancy probability fraction increases from near zero to high values of 0.9 or above.

If a non-linearity curvature is small enough, it can be well approximated by a straight line. For Gd-MRI it has been demonstrated this contrast agent has such weak curvature and approximate linearity. The calibration process for Gd-MRI concentration is the same as for iodine contrast CT. Namely, vials of known Gd-TPA concentration are placed into body phantoms and the observed MRI signal strengths are used to generate approximately linear calibration equation relations.

The intravenous injection dose units of mmol/kg mean thousandths of a mole of Gd per kG that the patient weights. The sensitivity of MRI to Gd is many orders of magnitude better than that of iodine contrast CT. The detected iodine concentrations are in the mg/ml range for X-ray CT while for Gd MRI the detected concentrations are in the ng/ml range. This means that lower concentrations of Gd can be injected with MRI and be detected than for iodine in X-ray contrast CT.

Figure 6:
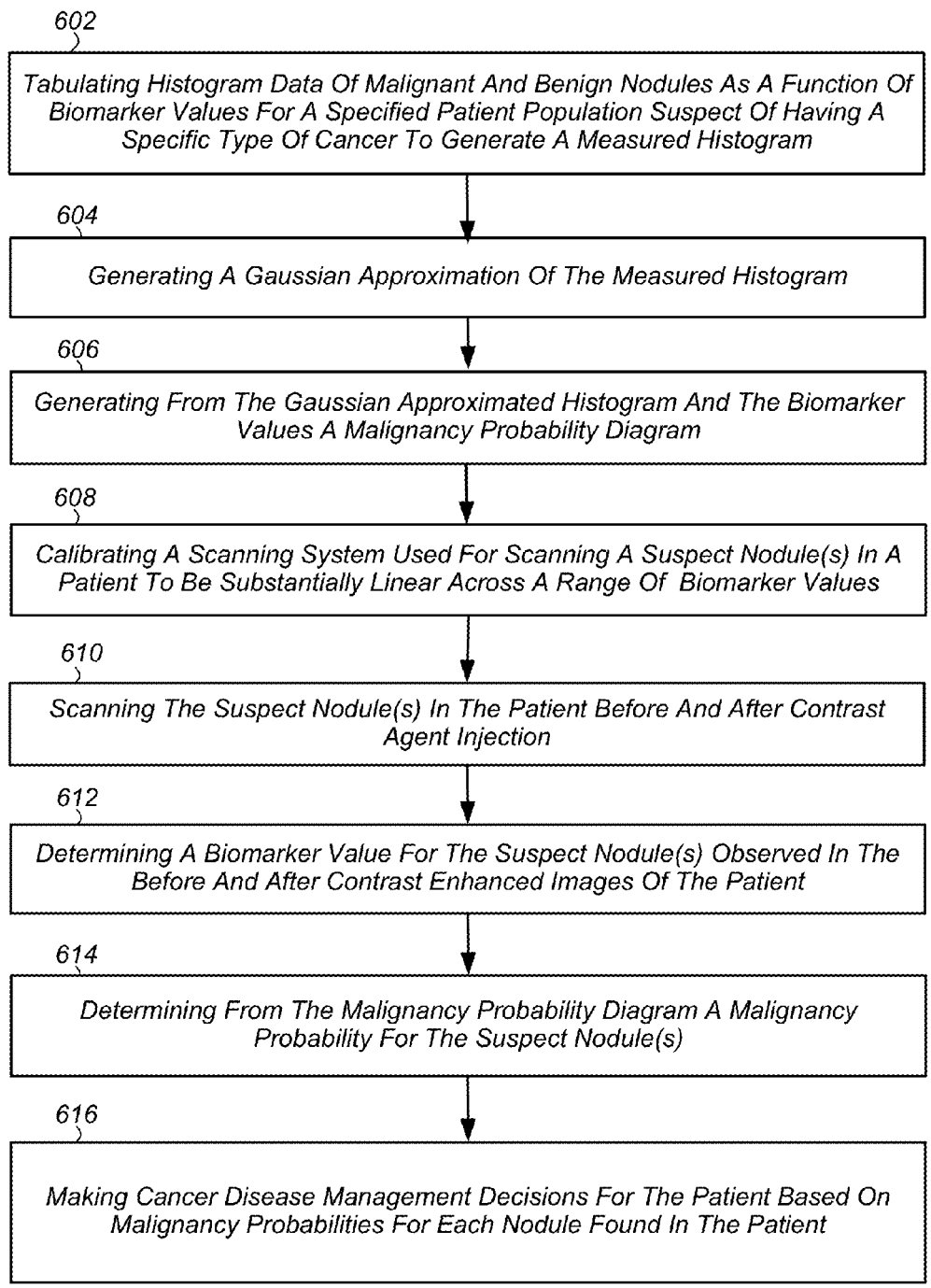
FIG. 6 is a flow diagram illustrating a method of determining the probabilities of identified suspect nodules being malignant for a specified patient population, according to an embodiment of the present invention.

FIG. 6 is a flow diagram illustrating one embodiment of a method for determining the probabilities of identified regions or nodules being malignant for a specified patient population suspect of having a specific type of cancer. The method begins with tabulating histogram data of malignant and benign nodules as a function of biomarker values for a specified patient population suspect of having a specific type of cancer to generate a measured histogram (step 602). As noted above the, the biomarker values can include mean concentrations of a contrast agent in generating an image data of the nodules used in calculating the histogram. The contrast agent can include Iodine and the biomarker values include mean Iodine concentrations ($I_c$) for each of the nodules determined from mean changes in HU values for all voxels in a CT image of the nodule. Alternatively, the contrast agent can include Gadolinium (Gd) or Gadolinium-Terephthalic acid (Gd-TPA) and the biomarker values include mean Gd-TPA concentrations for each of the nodules determined from changes in the ADC counts of an MRI scan of the suspect region or nodules. A Gaussian approximated histogram is then generated from the measured histogram (step 604), and a malignancy probability diagram that represents a probability that a suspect nodule having a specified biomarker value would be found to be malignant if biopsied is generated from the Gaussian approximated histogram and the biomarker values (step 606).

Preferably, a scanning system of the same type, i.e., a CT system or MRI system, used for scanning the nodules used to gather the histogram data is calibrated to be substantially linear across a range of biomarker values (step 608). More preferably, the scanning system is calibrated to be substantially linear across a range of biomarker values indicating malignancy probabilities of from about 0 to about 90%.

Next, a suspect nodule in a patient is scanned before and after contrast agent injection (step 610), and a biomarker value for the suspect nodule determined by observing the before and after contrast enhanced images of the patient (step 612). The suspect nodules can include for example, a nodule in breast tissue or in lung tissue. As noted above, the scanning system can be either an X-ray based system, such as a CT or CBCT system, or an MRI system.

Where the scanning system is a CBCT or CT system, scanning and determining the biomarker value for the suspect nodule can include injecting a contrast agent including iodine into the patient, performing a CT scan of the suspect nodule and determining mean changes in HU values for all voxels in the resulting CT image of the nodule, which are then translated into biomarker values of mean $I_c$ for the suspect nodule. Where the scanning system is an MRI system, scanning and determining the biomarker value for the suspect nodule can include injecting a Gd or Gd-TPA contrast agent into the patient, performing an MRI scan of the suspect nodule and interpreting the mean Gd or Gd-TPA concentrations as biomarker values for the suspect nodule.

Finally, a malignancy probability for the suspect nodule is then determined from the malignancy probability diagram (step 614), and cancer disease management decisions for the patient can be made based on malignancy probabilities for each nodule found in the patient, substantially without the need for biopsy of the nodule (step 616).

Figure 7A:
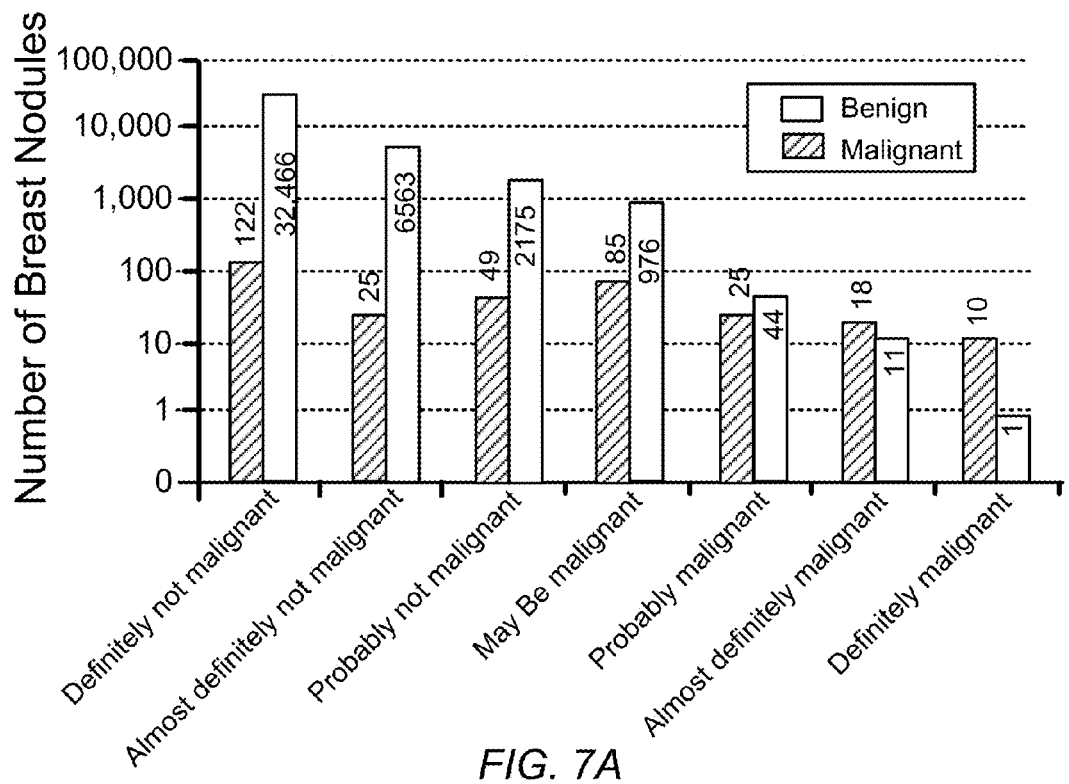
FIG. 7A is a measured data histogram of breast cancer nodules from the Digital Mammographic Imaging Screening Trial (DMIST), research study funded by the U.S. National Cancer Institute, shown as a function of the subjective mammography biomarker values or categories.
Figure 7B:
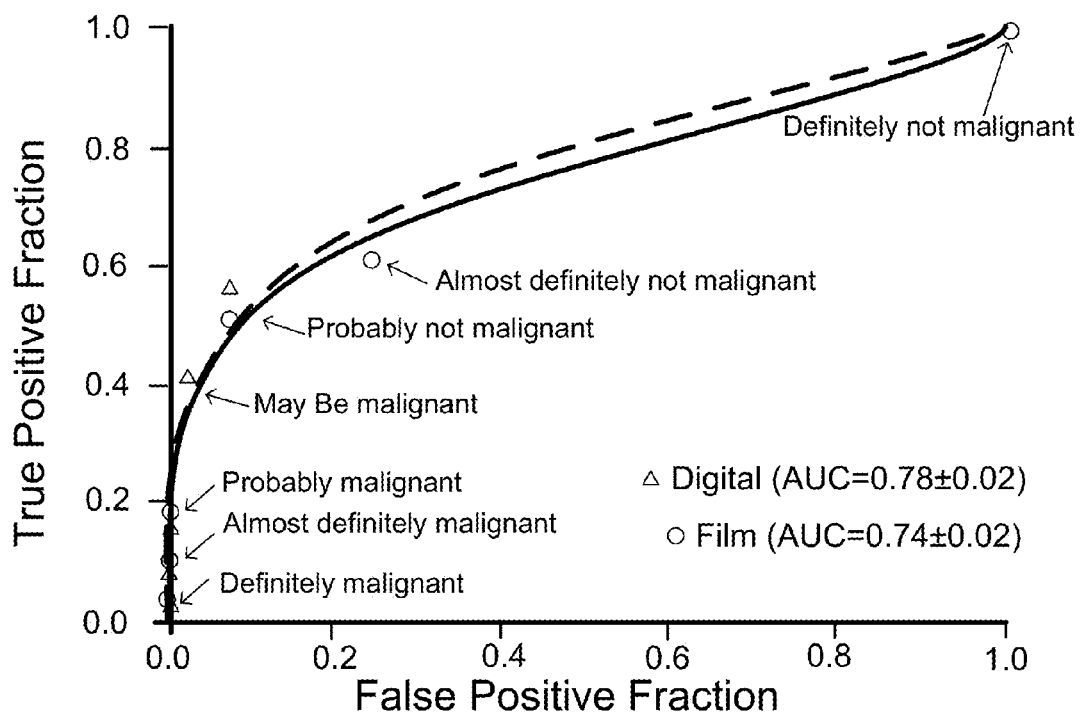
FIG. 7B is an ROC curve of true positive fractions versus false positive fractions for the population of breast cancer nodules from FIG. 7A, annotated with subjective mammography biomarker values or categories.

An alternative embodiment of using a mammography histogram to directly specify malignancy probabilities will now be described with reference to FIGS. 7A and B and FIG. 8. FIG. 7A is a measured data histogram of breast cancer nodules from the Digital Mammographic Imaging Screening Trial (DMIST), research study funded by the U.S. National Cancer Institute, shown as a function of mammography biomarker values or categories. FIG. 7B is an ROC curve of true positive fractions versus false positive fractions for the population of breast cancer nodules from FIG. 7A, annotated with mammography biomarker values or categories, and FIG. 8 illustrates mammography malignancy probabilities obtained from the DMIST histogram of FIG. 7A, according to an embodiment of the present invention.

Referring to FIG. 7A, it is noted that over 40,000 cases were involved in generating this histogram as compared to the much smaller number of cases used in generating the histogram for suspect nodules in breast tissue of FIG. 1. As a result the histogram of FIG. 7A does not have a bell-shaped distribution, and applying the Gaussian approximation is neither appropriate nor possible as the large sample renders smoothing essentially unnecessary. Note that the fraction of the population with verified malignancies (or prevalence) was very small, less than 0.8%.

The results in the histogram of FIG. 7A are based on the pattern recognition skills of highly trained and experienced mammographers and it clearly demonstrates their ability to identify patients with a high probability of having a malignancy if biopsied. These all came from a screening patient population where less than 0.8% had malignant breast lesions. For the screening cases judged "probably malignant", over ⅓ were found to have a malignant breast lesion. For the "almost definitely malignant" and "definitely malignant" categories, these malignancy probabilities exceeded 60% and 90% respectively. The resulting tradeoff for such high precision is shown in the ROC curve plotted in FIG. 7B. By the time the "pattern recognition" category had reach the "probably malignant" level, the sensitivity had dropped to below 0.2, meaning that over 80% of the patients who actually had malignant lesions would have been missed using this category as a screening threshold. Placing such a threshold at much "lower" category levels would have produced the unacceptably high false positive rates that accompany the low malignancy probabilities in FIG. 7A.

Figure 8:
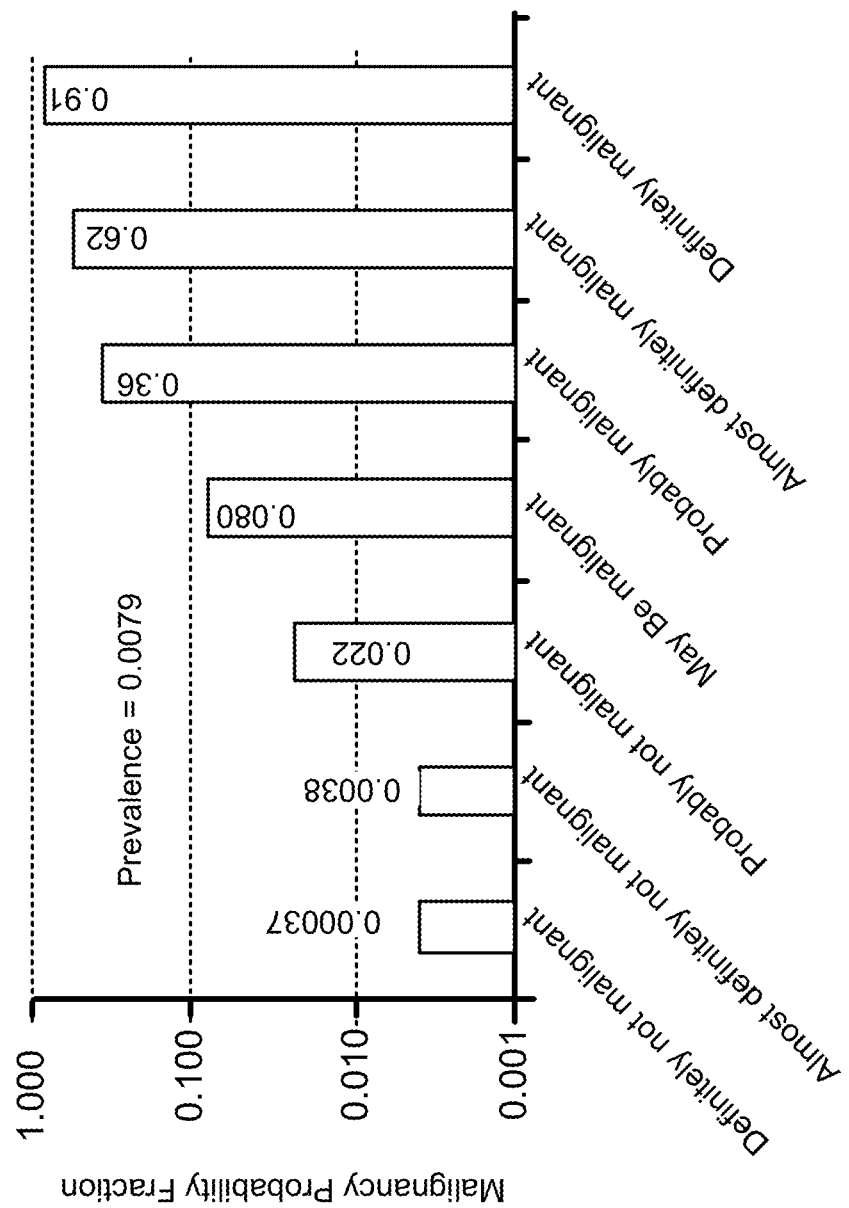
FIG. 8 illustrates mammography malignancy probabilities obtained from the DMIST histogram of FIG. 7A, according to an embodiment of the present invention.

Referring to FIG. 8, for each of the screening diagnosis categories in the digital mammography histogram in FIG. 7A, the ratio of the number of malignancies to the total number of benign and malignant findings for each category gave the malignancy probabilities shown in FIG. 8. The results in the histogram of FIG. 7A are based on the pattern recognition skills of highly trained and experienced mammographers and it clearly demonstrates their ability to identify patients with a high probability of having a malignancy if biopsied. These all came from a screening patient population where less than 0.8% had malignant breast lesions. For the screening cases judged "probably malignant", over ⅓ were found to have a malignant breast lesion. For the "almost definitely malignant" and "definitely malignant" categories, these malignancy probabilities exceeded 60% and 90% respectively. The resulting tradeoff for such high precision is shown in the ROC curve plotted in FIG. 7B. By the time the "pattern recognition" category had reach the "probably malignant" level, the sensitivity had dropped to below 0.2, meaning that over 80% of the patients who actually had malignant lesions would have been missed using this category as a screening threshold. Placing such a threshold at much "lower" category levels would have produced the unacceptably high false positive rates that accompany the low malignancy probabilities in FIG. 7A. These figures illustrate the utility that can come from determining malignancy probabilities directly from histogram data, and is a significant advantage of the present invention.

Figure 9:
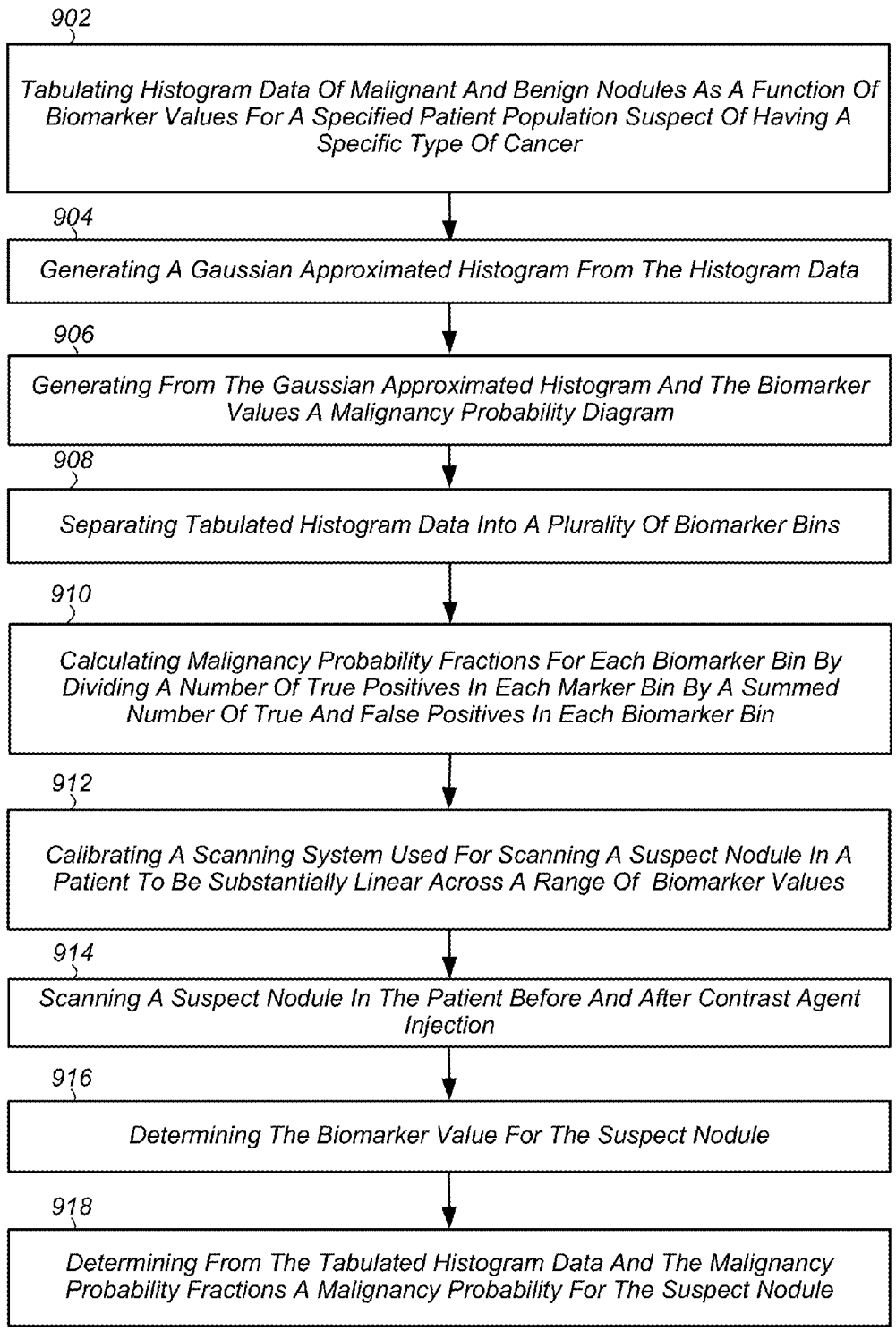
FIG. 9 is a flow diagram illustrating a method of determining the probabilities of identified suspect nodules being malignant for a specified patient population, according to another embodiment of the present invention.

FIG. 9 is a flow diagram illustrating another embodiment of a method for determining the probabilities of identified regions or nodules being malignant for a specified patient population suspect of having a specific type of cancer. The method begins with tabulating histogram data of malignant and benign nodules as a function of biomarker values for a specified patient population suspect of having a specific type of cancer to generate a measured histogram, where biomarker values comprise mean concentrations of a contrast agent in the nodules (step 902). As noted above the, the biomarker values can include mean concentrations of a contrast agent, such as Iodine, Gd or Gd-TPA, and can be determined for each of the nodules from an x-ray, such as a CT scan, or an MRI scan of the suspect region or nodules. A Gaussian approximated histogram is then generated from the histogram data (step 904), and a malignancy probability diagram that represents a probability that a suspect nodule having a specified biomarker value would be found to be malignant if biopsied is generated from the Gaussian approximated histogram and the biomarker values (step 906). Tabulated histogram data is then separated into a plurality of biomarker bins where the bins are ranges of biomarker values (step 908), and malignancy probability fractions calculated for each biomarker bin by dividing a number of true positives in each marker bin by a summed number the true and false positives in each biomarker bin (step 910).

Preferably, a scanning system of the same type, i.e., a CT system or MRI system, used for scanning the nodules used to gather the histogram data is calibrated to be substantially linear across a range of biomarker values (step 912). More preferably, the scanning system is calibrated to be substantially linear across a range of biomarker values indicating malignancy probabilities of from about 0 to about 90%.

Next, a suspect nodule in a patient is scanned before and after contrast injection (step 914), and a biomarker value for the suspect nodule determined (step 916). The suspect nodules can include for example, a nodule in breast tissue or in lung tissue, and the scanning system can be either an X-ray based system, such as a CT or CBCT system, or an MRI system. Finally, a malignancy probability for the suspect nodule is then determined from the tabulated histogram data and the malignancy probability fractions (step 918).

Figure 10:
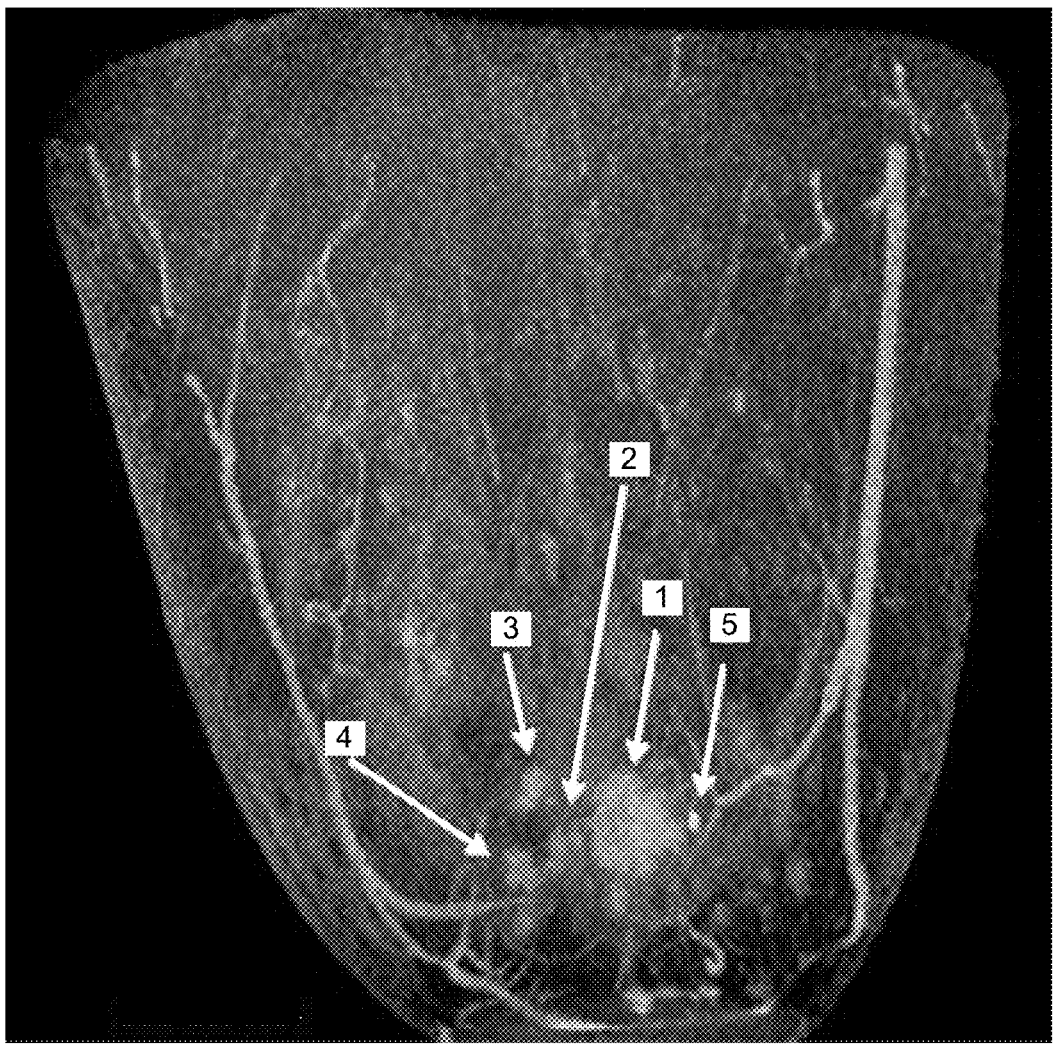
FIG. 10 is a 2D maximum-intensity-projection (MIP) image of a patient's breast made using cone beam CT (CBCT) system and illustrating 5 suspect nodules.

An alternative embodiment of maximum-intensity-projection (MIP) imaging and identification of suspect nodules will now be described with reference to FIGS. 5 and 10. FIG. 10 is a 2D maximum-intensity-projection (MIP) image of a patient's breast made using a CBCT system and illustrating 5 suspect nodules labeled 1 through 5. Referring to FIG. 10, this iodine contrast enhanced cone beam CT MIP image shows how the 5 enhanced suspect nodules were readily identified as opposed to the more line-shaped enhanced blood vessels.

Individual CT slices through each nodule were used to calculate the mean changes HU values of all the voxels in each nodule before and after contrast injection. These same regions were identified in the cone beam CT taken just before injection of the iodine contrast agent where the mean values of all the same voxels were also calculated. Subtracting these two means with-and-without-iodine means gave the changed CT number enhancement values. These CT number enhancement values were then converted into iodine concentration $I_c$ using the 81 kVp CBCT calibration expression in the upper left of FIG. 3. When plotted as vertical lines in FIG. 5, their intersections with the curve give the probabilities that each individual nodule would be found to be malignant if biopsied. Nodule 5 was a calcification with a 5% probability of being malignant. Nodule 1 (the only one identified by mammography) had a malignancy probability of 87%. Nodule 4 had a malignancy probability of 89% and Nodules 2 and, 3 had malignancy probabilities of 90% the maximum value of the corresponding histogram of FIG. 2. This illustrates the staging for treatment capability of the disclosed new method for identifying and ranking suspect breast cancer nodules with quantitative numerical values, here the mean iodine concentration $I_c$. This quantitative marker numerical value classification method is in sharp contrast to the "pattern recognition" classification methods of standard mammography.

For clarity of nodule identification, the skin of the breast was electronically removed prior to determination of the MIP image of FIG. 10. This involved setting a voxel threshold value of −300 HU to construct the outside surface of the skin (since it as all air with a −1000 HU value outside the breast). Then all the voxels within 2 mm inside this surface had their HU values replaced with values of −1000 HU, which removed the skin region from being detected in the MIP image generation process.

Figure 11A:
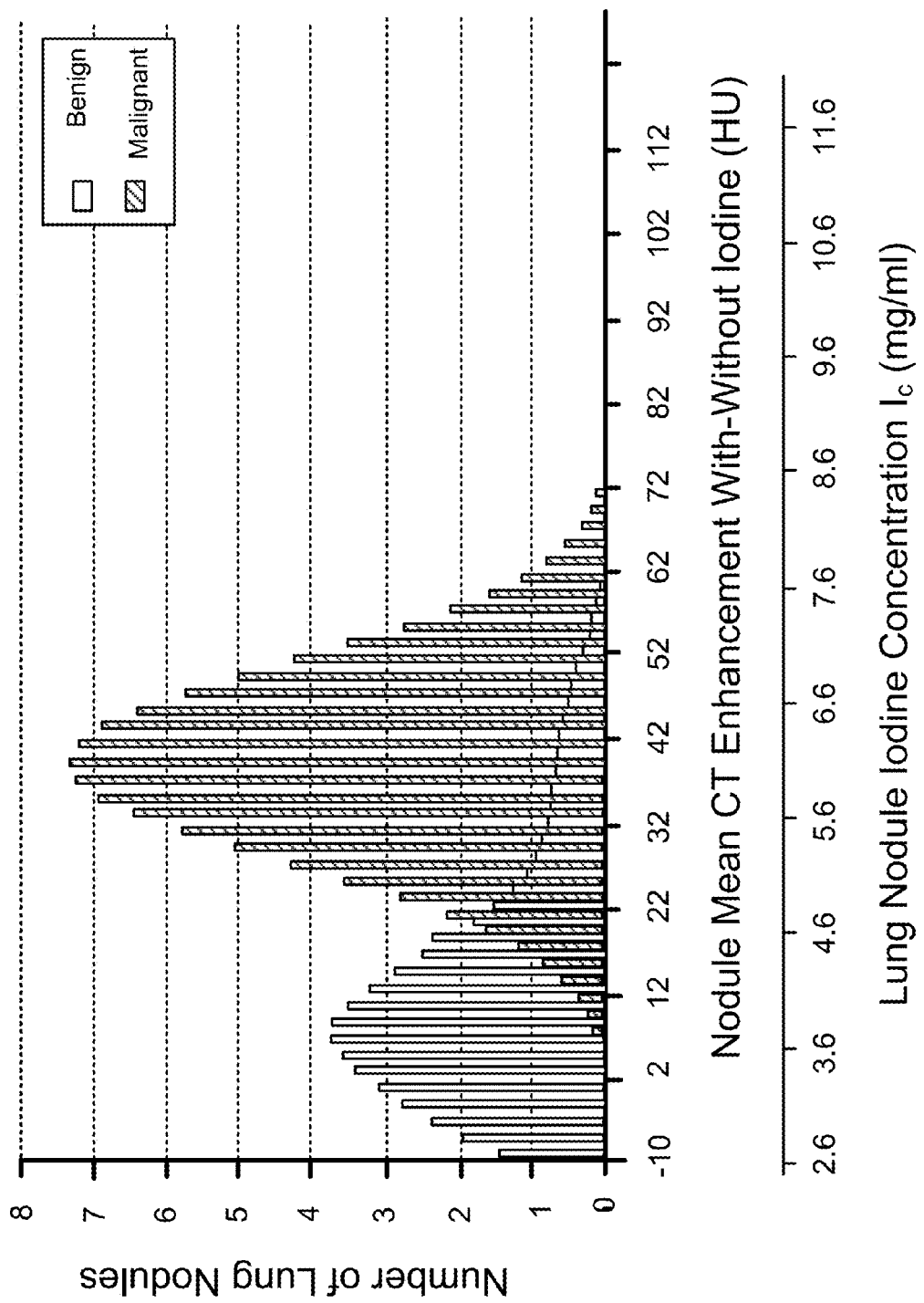
FIG. 11A is a Gaussian approximated histogram of suspect nodules in lung tissue for a specified patient population.
Figure 11B:
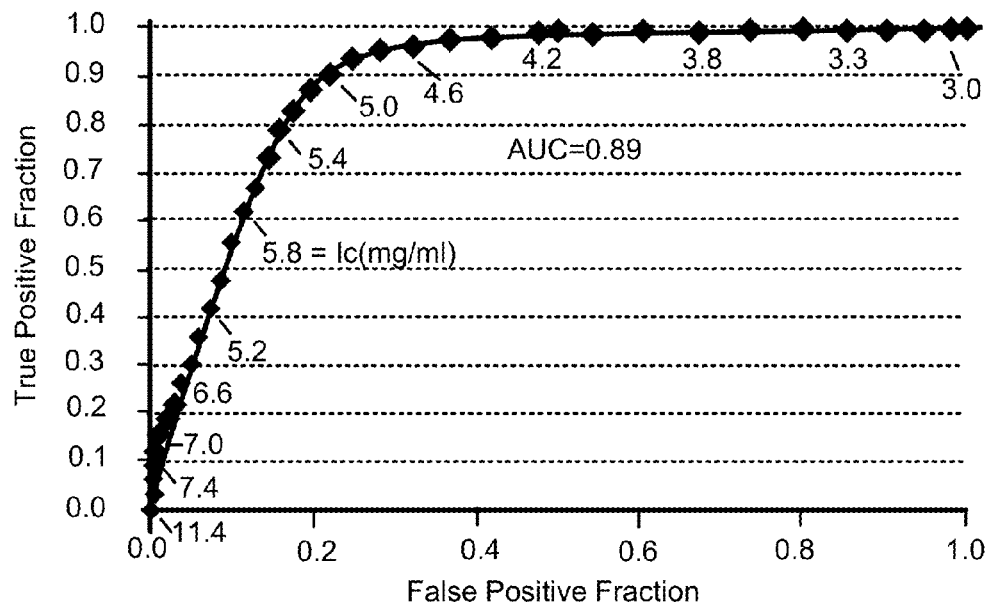
FIG. 11B is a receiver operator characteristic curve of true positive fractions versus false positive fractions for the suspect nodules of FIG. 11A, annotated with mean Iodine concentration ($I_c$) for each nodule, according to an embodiment of the present invention.
Figure 11C:
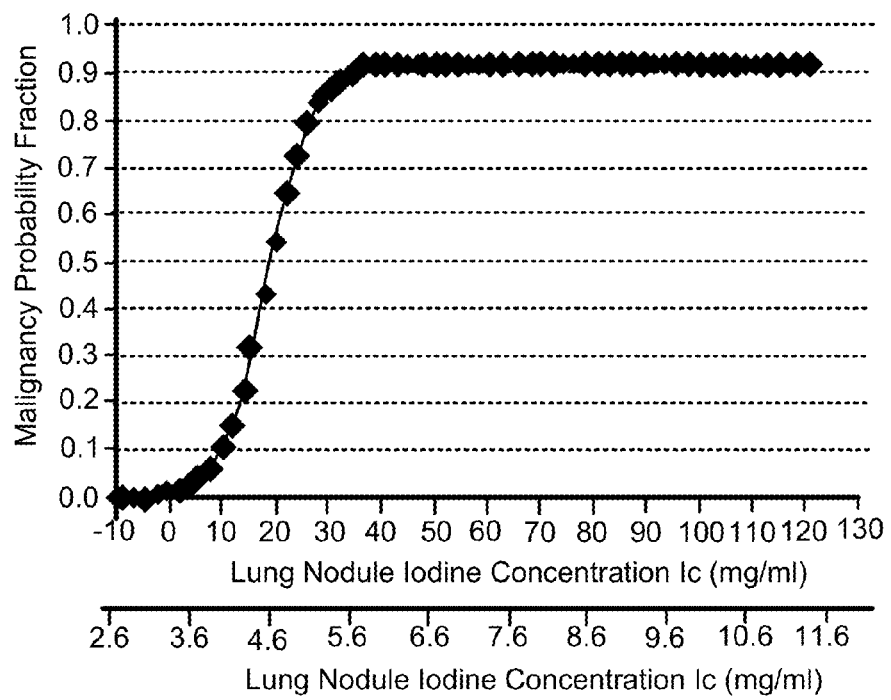
FIG. 11C is a malignancy probability diagram representing the probability that the suspect nodules in lung tissue are malignant, according to an embodiment of the present invention.

An embodiment of a method for determining malignancy probability of lung cancer nodules according to an embodiment of the present invention will now be described with reference to FIGS. 11A to 11C, where FIG. 11A is a Gaussian approximation histogram of suspect nodules in lung tissue for samples from a specified patient population, FIG. 11B is a receiver operator curve of true positive fractions versus false positive fractions for the suspect nodules of FIG. 11A, annotated with mean Iodine concentration (Ic) for each nodule, and FIG. 11C is a malignancy probability diagram representing the probability that the suspect nodules in lung tissue are malignant determined directly from the FIG. 11A data.

The method begins with a measured histogram data of suspect nodules in lung tissue for samples from a specified patient population and generating a Gaussian approximation histogram of lung cancer nodules illustrated by FIG. 11A. The malignancy probability diagram of FIG. 11C is then plotted directly from the Gaussian approximation histogram of lung cancer nodules in a manner similar to that done with FIG. 5 above. This is accomplished by calculating the number of malignant nodules in each bin from FIG. 11A divided by the total number of nodule in that same bin and plotting this malignancy fraction versus the biomarker iodine concentration in FIG. 11C. Each data point in FIG. 11C represents a number of malignant nodules in each iodine concentration bin divided by the total number of malignant and benign nodules in that bin for population sample containing 163 lung nodules. This is the Gaussian approximation estimate of the malignancy probability fractional values for the total patient population with solitary pulmonary nodules. However it can also be used for assessing the probability that any single nodule would be found malignant if biopsied exactly as illustrated in FIG. 5 for the 5 breast nodules. Note that this determination does not require that the biopsy actually be done. Once the procedure has been validated in a large enough study using biopsy as the ground truth, it would thereafter provide reliable estimates of what biopsy would provide without requiring an actual biopsy. This constitutes a substantial benefit to the patient in sparing him or her from the pain and recovery time of the biopsy process, and benefit the cancer disease management system as a whole by reducing costs. The cost reduction comes not only from eliminating the biopsy but also from decreasing the need for the expensive medical professionals no longer needed for the tedious pattern recognition since a single quantitative number (mean iodine concentration Ic) is all that is required for accurate diagnosis, as evident from the high area under curve (AUC) of 0.89 shown in FIG. 11B. This ROC curve also came directly from plotting the fractions determined directly from Gaussian Approximation histogram.

The most general alternative embodiment of determining outcomes using the probability determination methods of the present invention will now be described with reference to FIGS. 12A through 17B. Note, although described in detail with particular reference to methods of determining malignancy probability fractions versus biomarker values for cancer disease management, it will be evident to one skilled in the art that the method illustrated in the preceding figures may be generalized to any positive probability fractions as function of their "marker" values where the "true positive" could be any measureable entity, idea or quality not just a true positive malignancy.

Figure 12A:
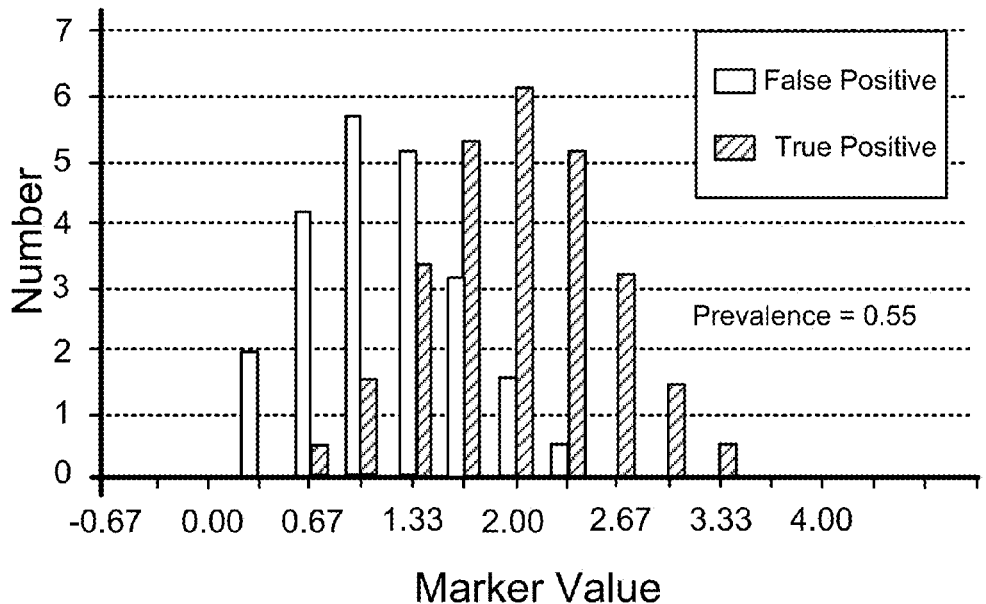
FIG. 12A is a modeled histogram of the number of true and false positives versus marker values according to an embodiment of the present invention.
Figure 13A:
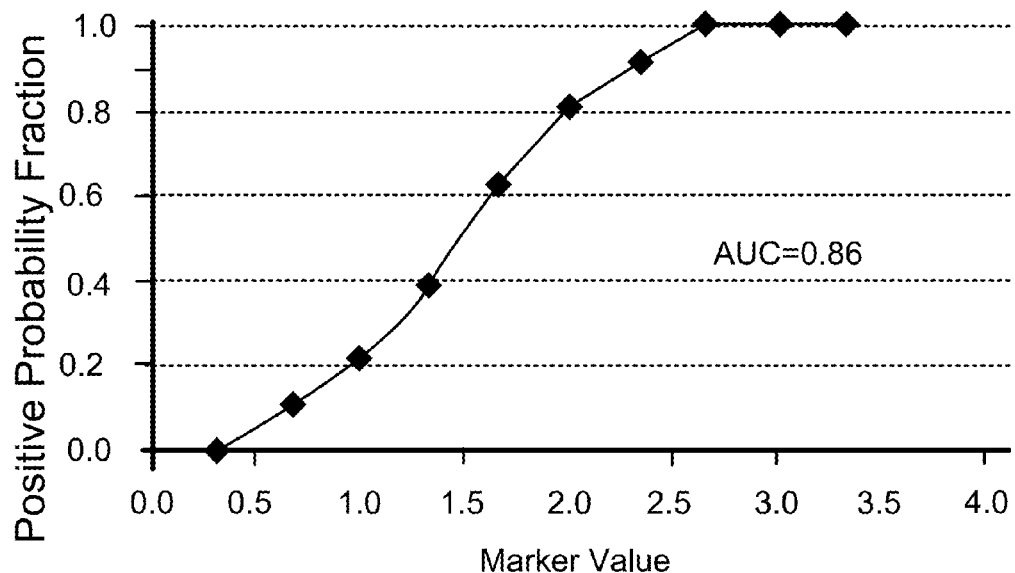
FIG. 13A is a graph plotting a ratio of positives in every marker bin to the total number of positives and negatives in every bin that gives a positive probability fraction according to an embodiment of the present invention.
Figure 14A:
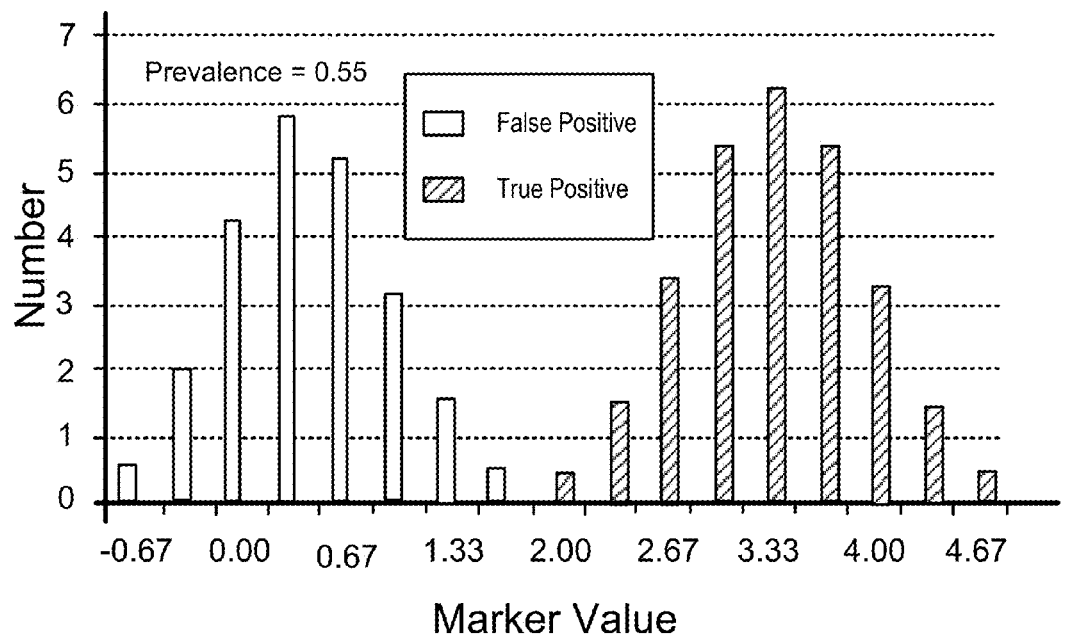
FIG. 14A is a modeled histogram of the number of true positive and false positives as a function of marker values illustrating the case where the case where the two distributions have no overlap according to an embodiment of the present invention.
Figure 14B:
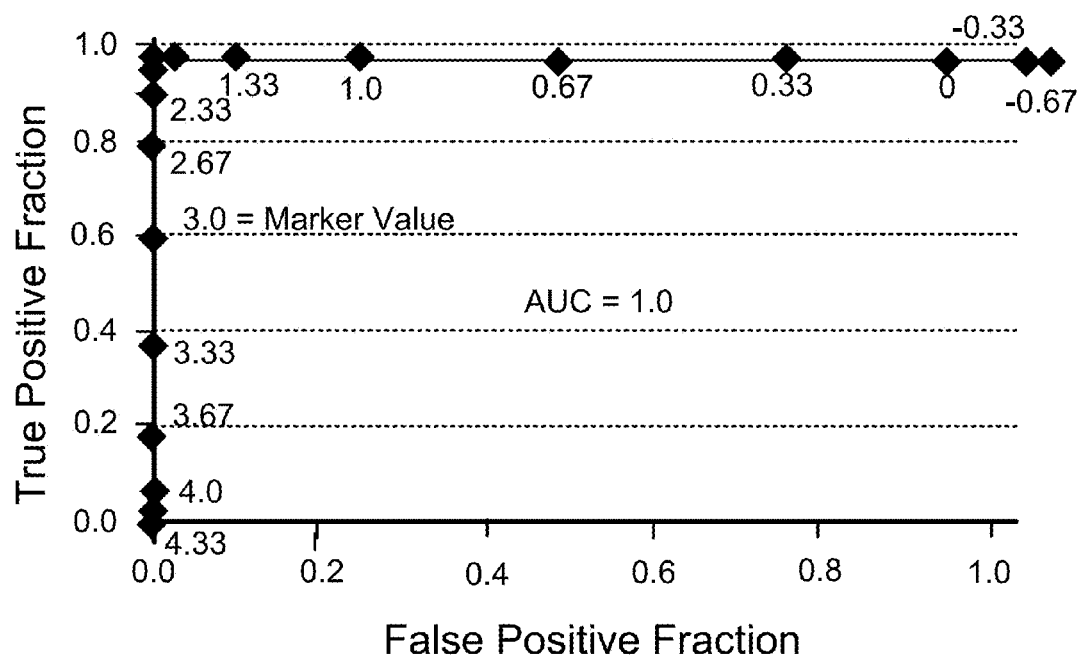
FIG. 14B is a receiver operator characteristic curve of true positive fractions versus false positive fractions for the histogram of FIG. 14A, annotated with marker values for each data point, according to an embodiment of the present invention.
Figure 15A:
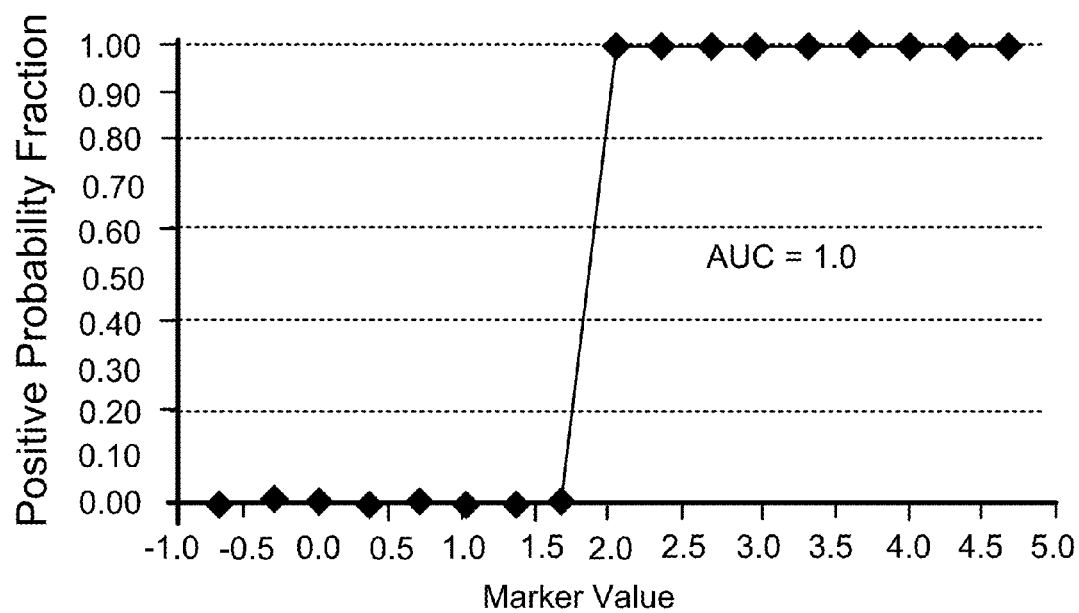
FIG. 15A is a graph illustrating how positive probability fraction vary with the marker values according to an embodiment of the present invention.
Figure 16A:
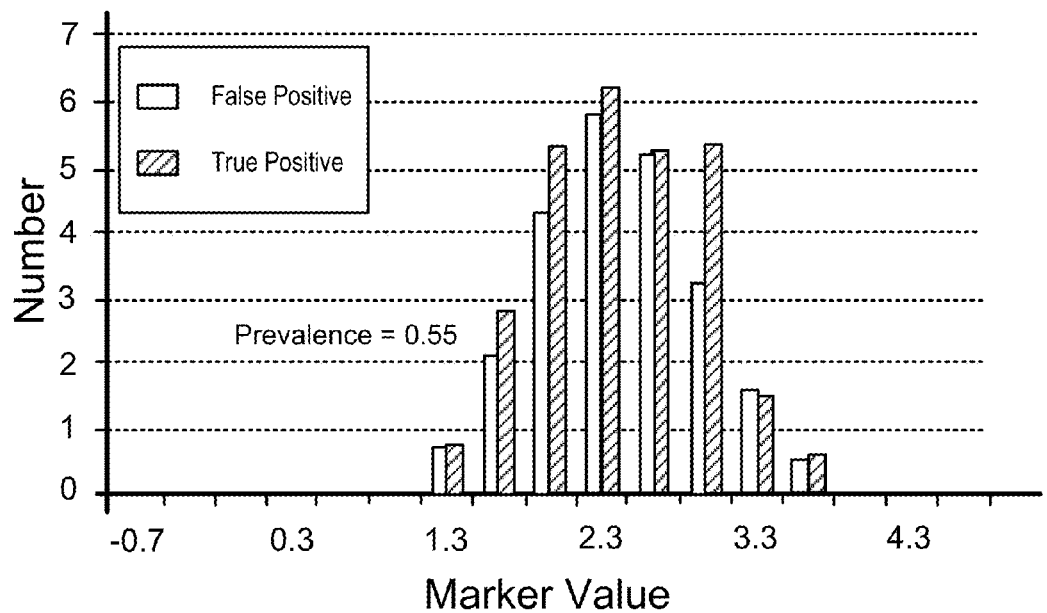
FIG. 16A is a modeled histogram of two completely overlapping distributions according to another embodiment of the present invention.
Figure 16B:
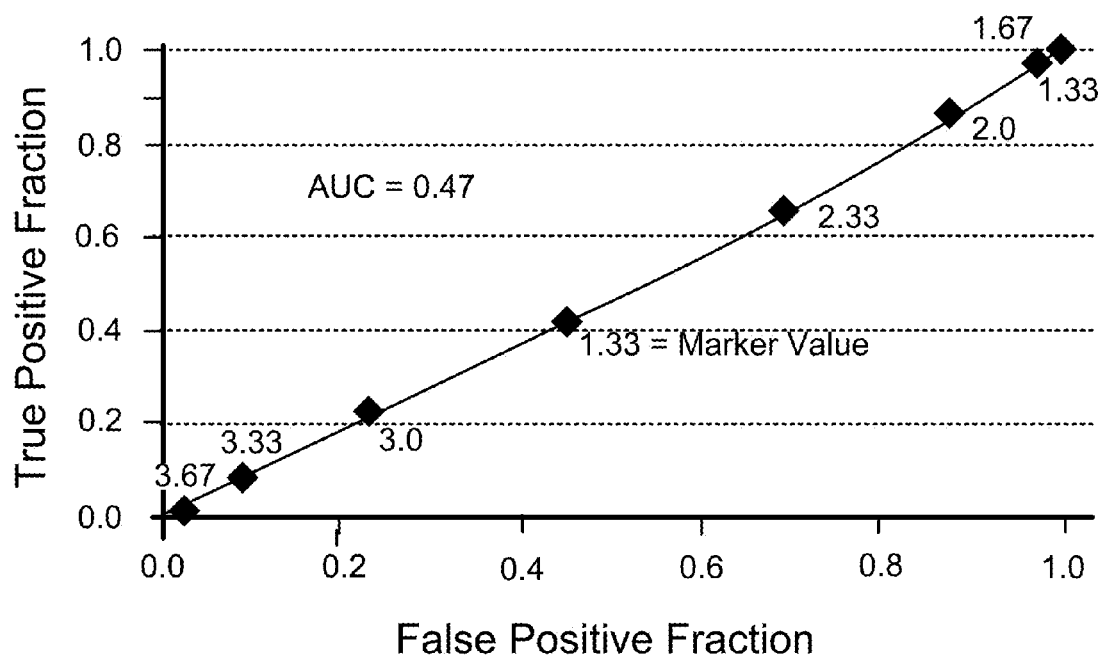
FIG. 16B is a receiver operator characteristic curve of true positive fractions versus false positive fractions for the histogram of FIG. 16A, annotated with marker values, according to an embodiment of the present invention.
Figure 17A:
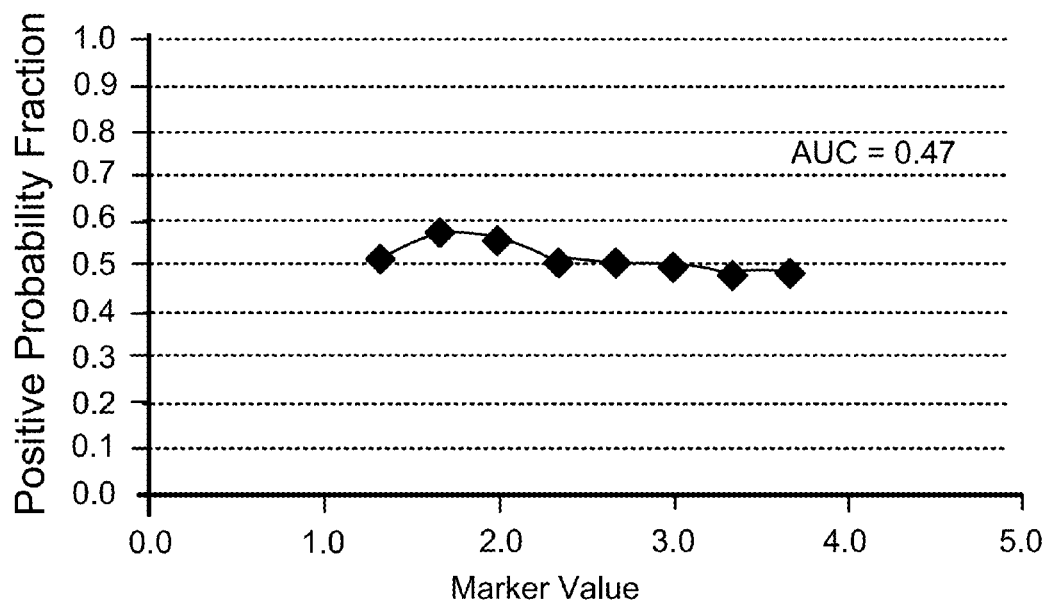
FIG. 17A is a graph illustrating how positive probability fraction vary with the marker values according to another embodiment of the present invention.
Figure 17B:
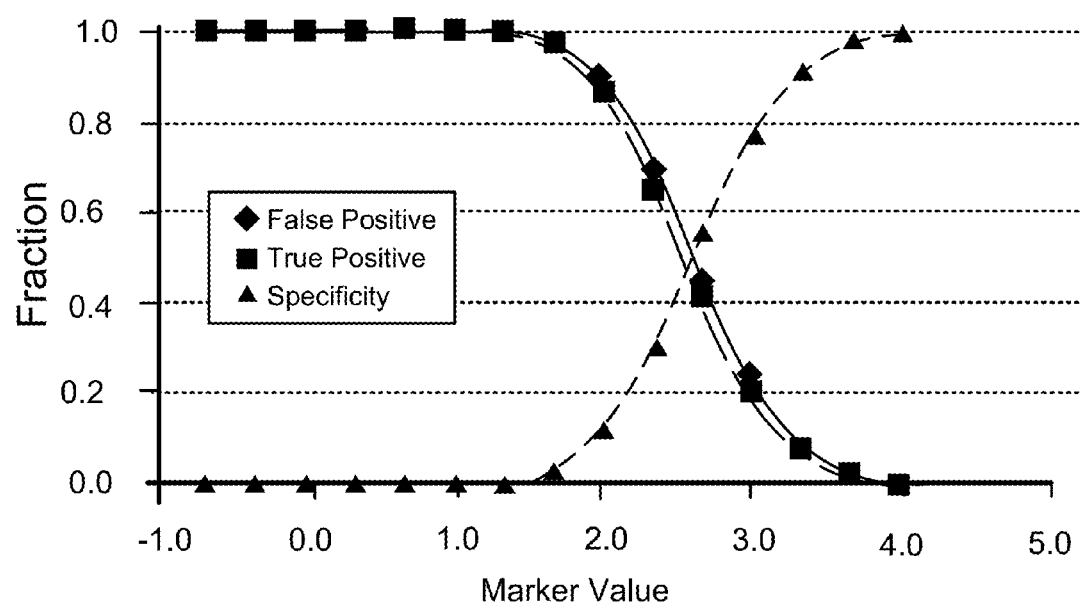
FIG. 17B is a graph illustrating how true and false positive fractions and specificity vary with the marker values according to an embodiment of the present invention.

In particular, it is noted that in this the most general embodiment the histograms illustrated by FIGS. 12A, 14A and 16A, are not necessarily restricted to being Gaussian approximated histograms, particularly if the number of samples included is sufficient to substantially eliminate the need for smoothing. In this most general case each histogram (FIGS. 12A, 14A, and 16A) are then translated into their corresponding "true positive" probability (not just malignancy probability) fractions, such as represented in FIGS. 13A, 15A and 17A respectively, by dividing number of true positives in each marker bin by the total number of true and false positives in each histogram bin.

Figure 12B:
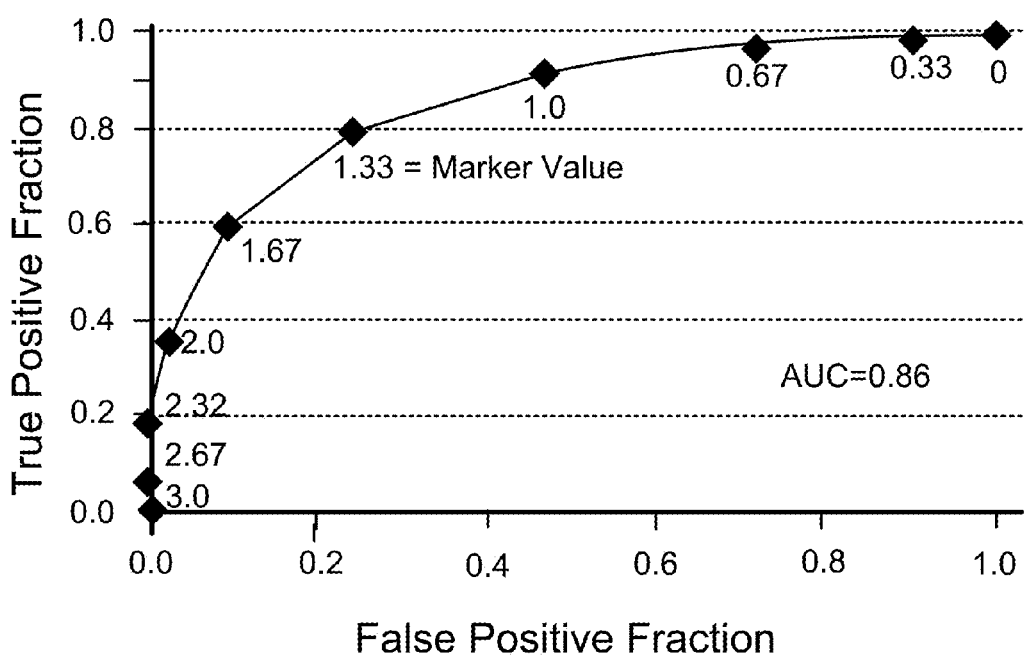
FIG. 12B is a receiver operator characteristic curve of true positive fractions versus false positive fractions for the histogram of FIG. 12A, annotated with marker values for each data point, according to an embodiment of the present invention.

Turning now to the particular embodiments of FIGS. 12A through 17B, the most general alternative embodiment of determining malignancy probabilities using the method of the present invention will now be described with reference to FIGS. 12A and 12B. FIG. 12A is a modeled histogram of true and false positives, and FIG. 12B is a receiver operator curve of true positive fractions versus false positive fractions for the suspect nodules of FIG. 12A, annotated with marker values for each nodule.

These figures assume two true positive and false positive outcomes distributions for any defined ground truth corresponding to a quantitative marker value. Previously described embodiments have been concerned with cancer, but this embodiment describes how the method of the present invention can be applied to any other general conditions of interest. One can see if one starts with a marker value of zero all of the true and false positives are to the right of this threshold, defining the (1.0,1.0) data point at the upper right of the ROC curve on the right side of FIG. 12B. As one raises this threshold above 0.6, true positives are beginning to be lost and the true positive fraction falls below 1.0. Increasing the marker threshold beyond 2.3, only true positives are left to the right. Thus the ROC intersects the vertical axis at this point. For this model example the AUC value is 0.86.

Figure 13B:
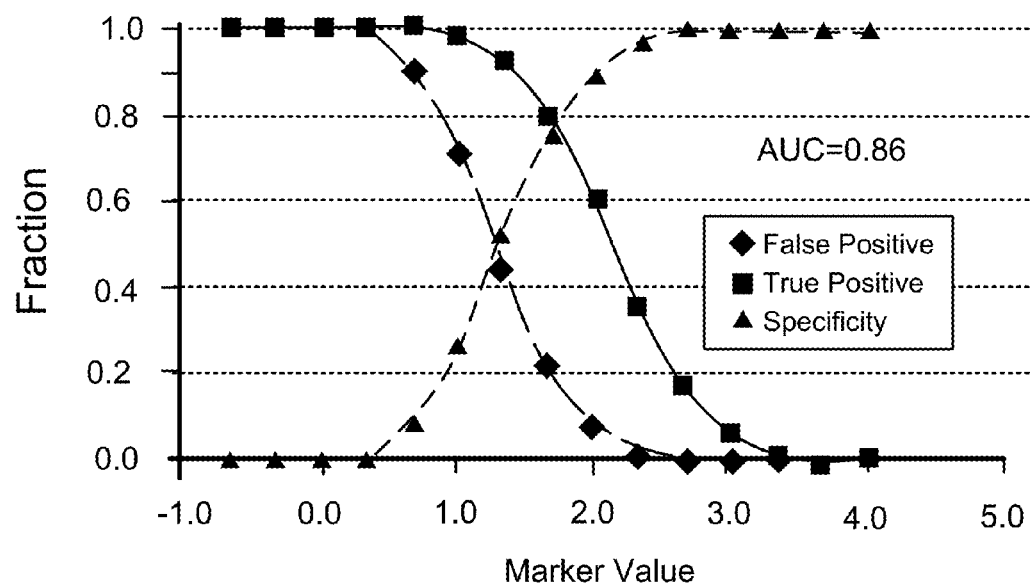
FIG. 13B is a graph illustrating how the true positive and false positive fractions and specificity vary with the quantitative marker value according to an embodiment of the present invention.

FIG. 13A is a graph plotting the positive probability fraction, that is a ratio of true positives in every marker bin to the total number of true and false positives in every bin, versus the quantitative marker values. This ratio is the probability that a true positive outcome will result if the ground truth test were applied to any element of a population that has the designated marker value. FIG. 13B is a similar plot versus the quantitative marker values illustrating how the true positive and false positive fractions and specificity (equal to 1 minus the false positive fraction) vary with the quantitative marker value. These are not only characteristic to a population being assessed. These values also give the probabilities of any one element of a population that this element has specific true positive probability or true positive fraction values or specificity that is the intercept of the FIG. 13B curves with a vertical line drawn at any specific marker value.

Changing the location of the two assumed histogram distributions sets limits for the probabilities that can be estimated by the current disclosure methods. This will now be explained in greater detail with reference to FIGS. 14A and 14B. FIG. 14A models the case where the two distributions have no overlap. Here the distribution shapes and magnitudes are unchanged from FIGS. 12A and 12B. Only their positions versus the marker values have been shifted up and down.

If the marker threshold is set at −0.67, then all of the true and false positives are to the right of this position. This gives the upper right hand (1.0, 1.0) data point of the ROC curve on the right in FIG. 14B. As this threshold is increased toward 2.0 the false positives are successively eliminated. For the marker threshold set at 2.0, all of the true positives are to the right and none of the false positives remain. This corresponds to perfect diagnosis and the top left data point (1.0, 0.0) in the ROC curve of FIG. 14B. Further increase in the marker threshold value successively eliminates all of the true and false positives until no true positives or false positives are on its right side. This gives the lower left data (0.0, 0.0) point of the ROC curve. With a height and width of 1.0 the area under this curve (AUC) is 1.0. Achievement of this 1.0 AUC value indicates that correct selection of the marker threshold value allows perfect diagnosis or decisions, which is the upper limit of such performance.

Figure 15B:
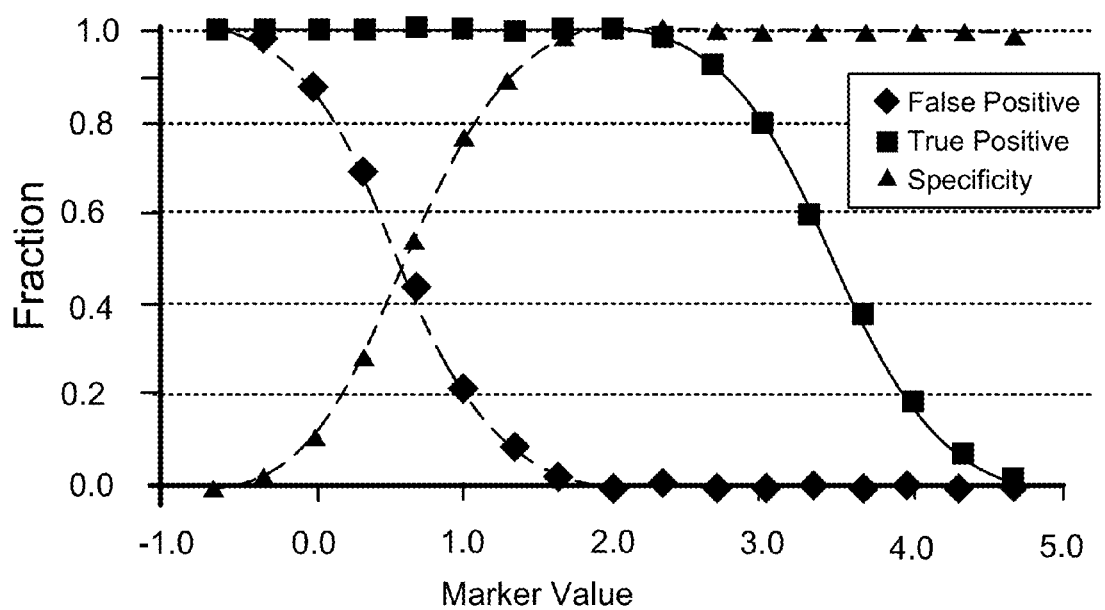
FIG. 15B is a graph illustrating how true and false positive fractions and specificity vary with the marker values according to an embodiment of the present invention.

The corresponding positive probability, true positive and false positive fractions and specificity are plotted in FIGS. 15A and 15B. As seen on the left changing from one marker bin at a marker value of 2.0 produces a 0 to 1.0 change in the positive probability fraction that illustrates perfect diagnosis or decision. Similarly the right side shows that the false positive fraction goes to zero while the true positive still maintains a 1.0 value at the marker value of 2.0. Furthermore the specificity also goes to 1.0 at the 2.0 marker value. Again if one has marker values for individual elements of the population represented by the histogram, then the intersection of vertical lines of each elements marker value give the corresponding true positive, false positive fractions and specificity values for the designated element.

The opposite limit is shown by the modeled histogram distribution of FIG. 16A again with the same shapes as FIGS. 12A and 14A, but now shifted in marker values to completely overlap. If one starts with the marker threshold value of 1.3, then all of the true and false positives are to the right of it, giving the upper right hand (1.0,1.0) data point of the ROC curve in FIG. 16B. Raising the threshold just gives almost the same fraction of negatives and positives because of their similar shapes and overlap. When the marker threshold rises to 3.7, then no true or false positives are on its right. This gives the lower left ROC curve (0.0, 0.0) data point.

The positive probability fraction of FIG. 17A is essentially 0.5 (±0.1). This says the diagnostic probability is the same as the flip of a coin or totally random. A high marker values gives no more diagnostic or decision information than a low value. The true and false positives of FIG. 17B hardly split apart and the specificity rises to high values only for marker threshold values where the true positives are almost totally exhausted.

Figure 18:
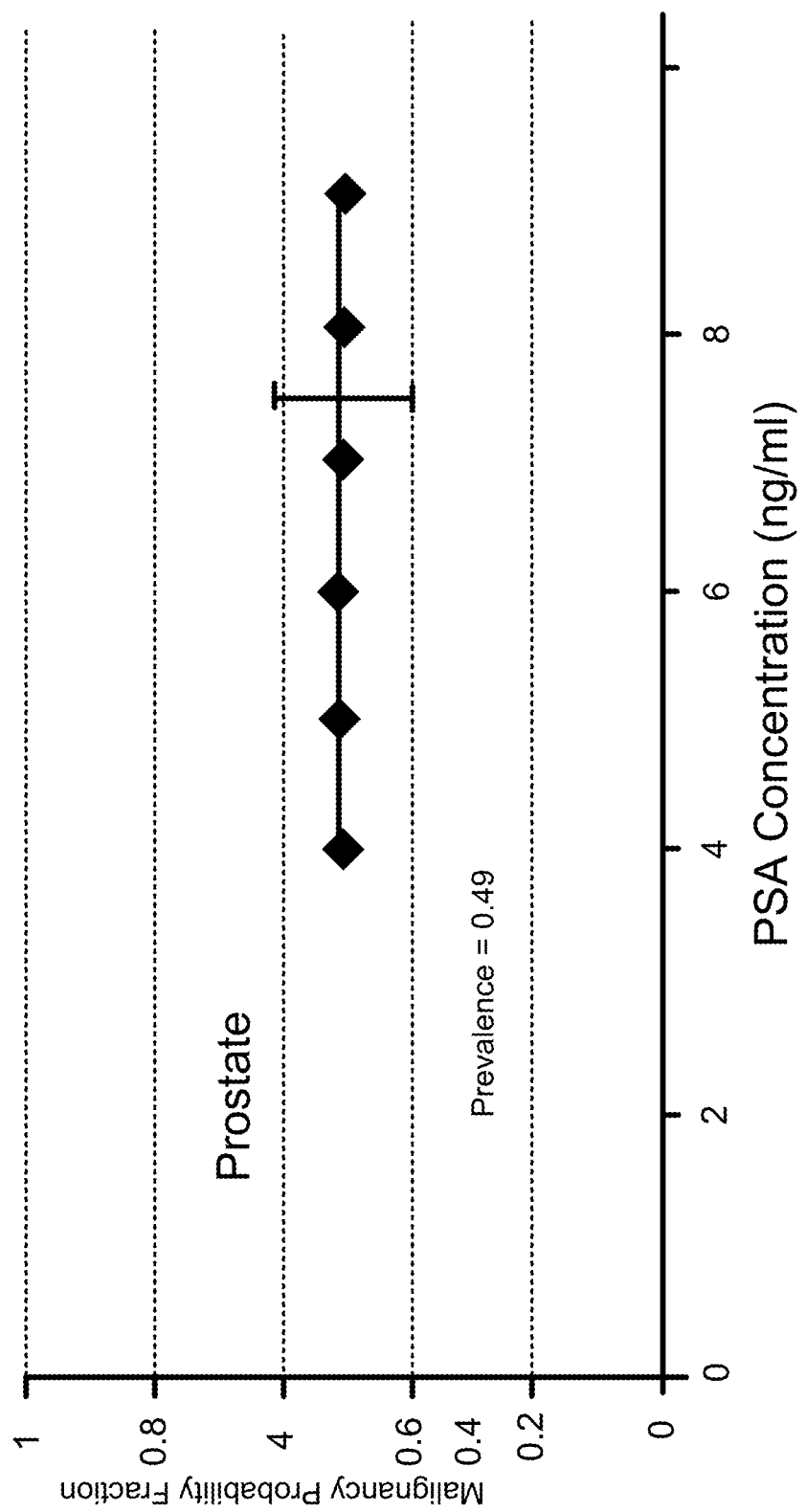
FIG. 18 is a malignancy probability diagram derived from data from PSA Cancer Screening, according to an embodiment of the present invention

An alternative embodiment illustrating the potential value of the inventive methods described in this disclosure for evaluating various diagnostic methods will now be described with reference to FIG. 18. FIG. 18 is a malignancy probability diagram derived from data from PSA Cancer Screening, according to an embodiment of the present invention. This embodiment illustrates the potential value of the new methods described in this disclosure for evaluating various diagnostic methods. A malignancy probability fraction estimate corresponding to that shown in FIG. 5 for breast nodules is shown in FIG. 18. However comparisons of FIGS. 16A and 16B and their similar prevalence values indicate that their total probabilities of malignancy (i.e. their prevalence) are quite similar. Nevertheless, the PSA value of 4 ng/ml gives no more diagnostic information than a value of 9 ng/ml or any PSA values in between. The probability that a given patient with a given PSA value has a malignant prostate using only that PSA value is totally random. In contrast, the malignancy plot shown in FIG. 18 provides clear information about the value of this specific PSA diagnostic technique, with a histogram established by a ground truth (biopsy for this prostate case). It is an indication why so many reports question the value of PSA as a diagnostic screening technique for prostate cancer.

In yet another aspect the invention is directed to a method of correlating higher $G_d$ contrast enhancement to higher malignancy growth rates and to higher rates of malignancy metastasis rates. For example, tumor growth rate (TGR) or equivalently tumor volume doubling time (TVDT) in solid lesions may be used to predict survival rate. The data described immediately below is from X-ray mammography studies that should be predictive of what would be found in substituting MRI imaging for X-ray imaging. FIG. 19A illustrates an example histogram of the frequency that a given TGR (described by a log doubling time) from analysis of MRI screening for breast lesions, would have a given growth rate in exams of breast cancer patients taken overtime. By such as taking the logarithm of the TVDT, a distribution such as a normal bell shaped one shown in FIG. 19A is found, where the fastest growing portion is identified as Group A, and the second and the third portions are identified as Group B and Group C, respectively.

Figure 19B:
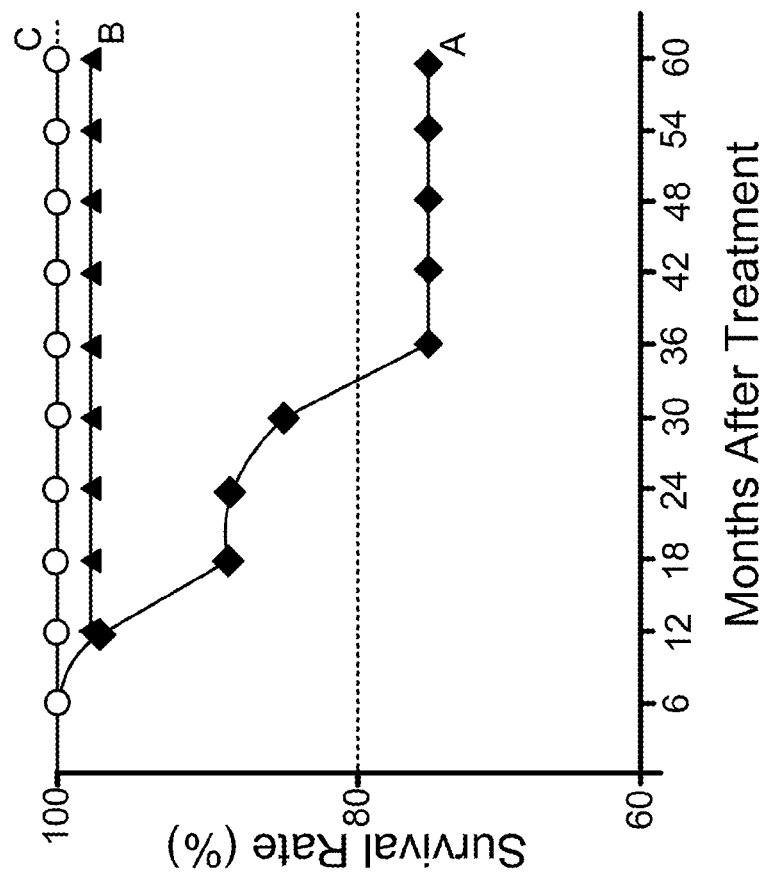
FIG. 19B illustrates a relationship between cumulative survival rates and months after initial treatment.
Figure 19A:
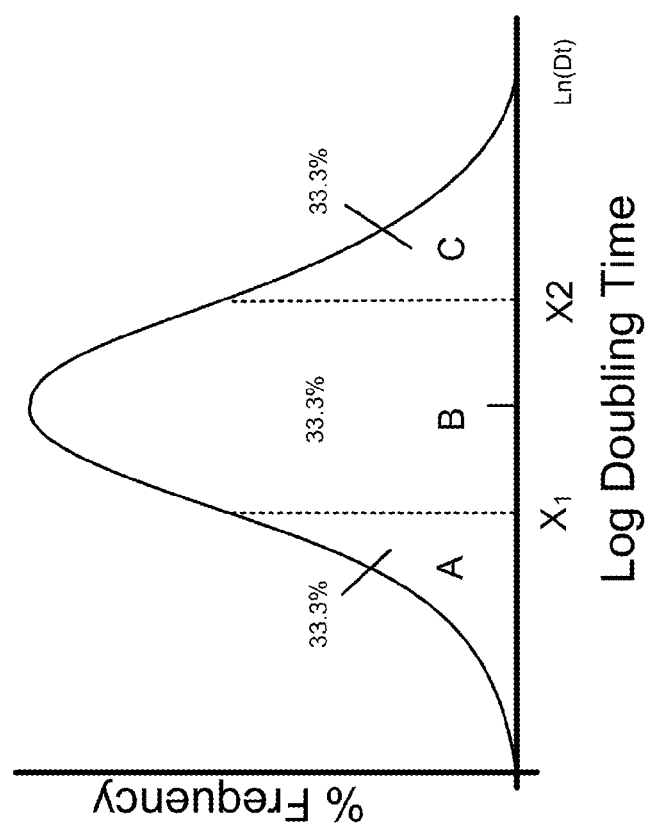
FIG. 19A illustrates an example histogram of the frequency that a given Tumor Growth Rate (described by a log doubling time) from analysis of X-ray screening mammogram lesions with measured growth rates in mammograms of breast cancer patients taken over time.

FIG. 19B illustrates a relationship between cumulative survival rates and months after initial treatment taken from an x-ray mammography study, in accordance with one embodiment of the present disclosure. In one implementation, after a 36-month follow up, Group A with the fast growth rates have the lowest survival percentages (less than 80%) compared to over 95% survival percentages for Groups B and C. The X-ray mammogram study related to FIG. 19 also includes measuring the microvessel densities of the biopsied lesions of the selected population of patients, and the study finds that the highest densities correlate with the fastest growth rates. However, in one embodiment, biomarkers such as Gd contrast enhancement are used, because their values should monotonically increase with MVDs. This is important because biomarker values can be obtained by in vivo imaging without the need for biopsy. Because of the leaky nature of microvessels, the higher their density the higher the Gd contrast enhancement may be expected.

Figure 20:
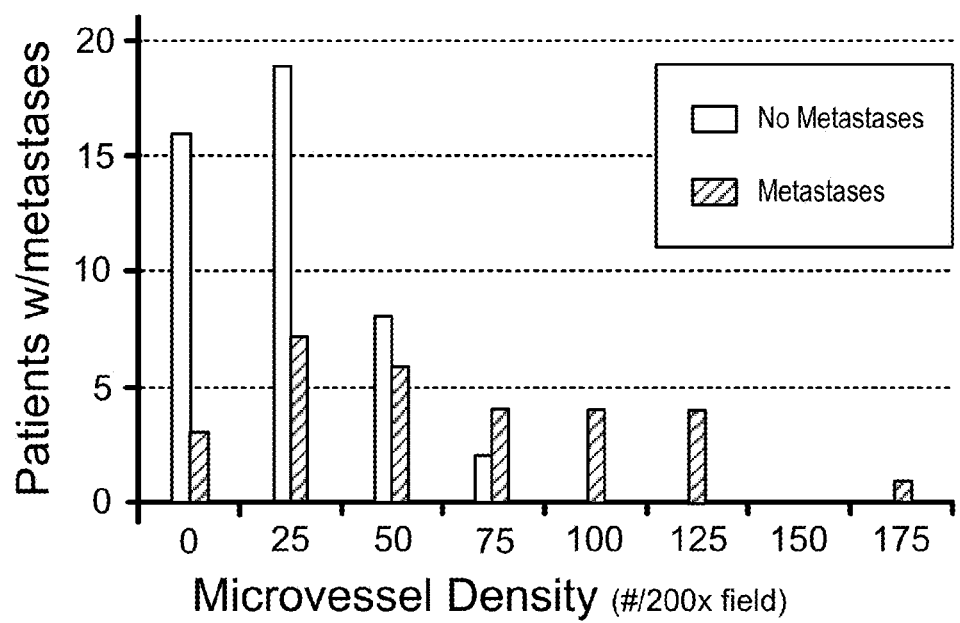
FIG. 20 illustrates an example histogram showing microvessel densities (MVDs) measured in prostates of a selected population of patients that are correlated with metastases occurrences.

In another aspect or embodiment the invention is directed to a method of determining malignancy probability fractions versus biomarker values for cancer disease management based on microvessel density information. FIG. 20 illustrates an example histogram showing microvessel densities (MVDs) measured in prostates of a selected population of patients that are correlated with metastases occurrences.

Referring to FIG. 20, measurement in vivo of MVDs was made for a total population of 74 patients. The MVDs are expressed in as a number of microvessels per 200× field along the horizontal axis. Subsequent biopsy determined 29 patients of the 74 patients exhibited metastases while 45 did not.

Figure 21:
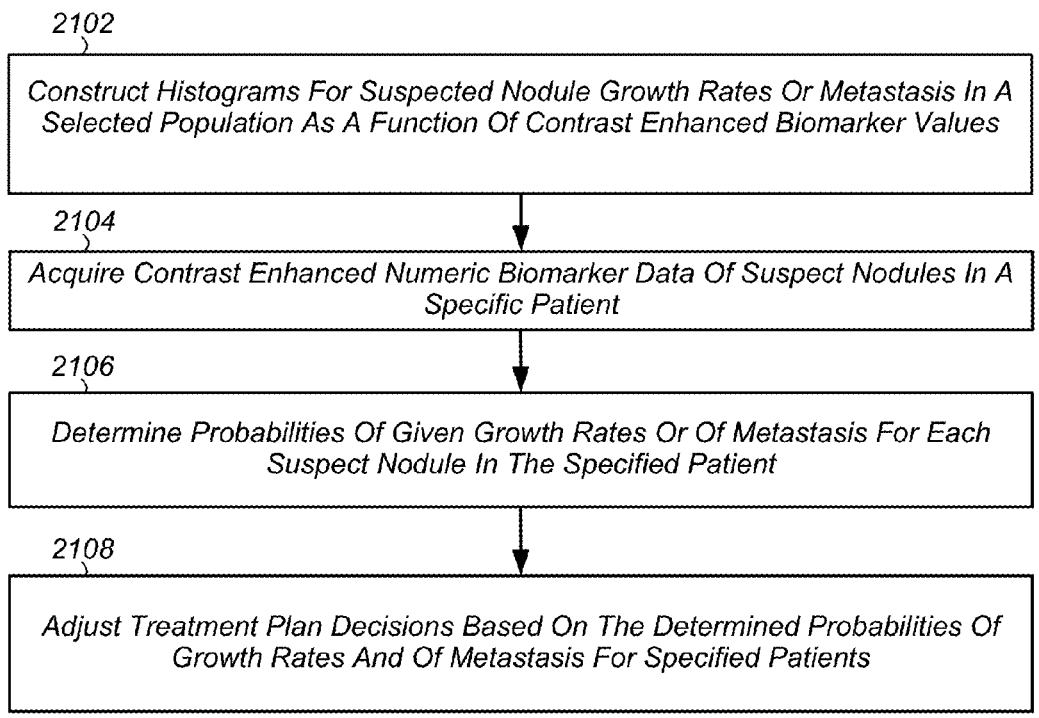
FIG. 21 is a flow diagram illustrating a method of identifying, assessing, and treating cancer with high growth rates or with high metastasis potential for a patient, according to an embodiment of the present invention.

FIG. 21 illustrates an exemplary method of identifying, assessing, and treating cancer with high growth rates or with high metastasis potential for a patient, in accordance with one embodiment of the present disclosure. The method begins with constructing histograms for suspected nodule growth rates or metastasis in a selected population as a function of contrast enhanced biomarker values (step 2102). As noted above the, the biomarker values can include mean concentrations of a contrast agent in generating an image data of the nodules used in calculating the histogram. The contrast agent can include Iodine and the biomarker values include mean Iodine concentrations ($I_c$) for each of the nodules determined from mean changes in HU values for all voxels in a CT image of the nodule. Alternatively, the contrast agent can include Gadolinium (Gd) or Gadolinium-Terephthalic acid (Gd-TPA) and the biomarker values include mean Gd-TPA concentrations for each of the nodules determined from changes in the ADC counts of an MRI scan of the suspect region or nodules. Contrast enhanced numeric biomarker data is then acquired of suspect nodules in a specific patient (step 2104), and malignancy probabilities of given growth rates or of metastasis determined for each suspect nodule in the specified patient (step 2106). Finally, treatment plan decisions based on the determined probabilities of growth rates and of metastasis may be adjusted for specified patients (step 2108).

In another aspect of the invention a mean HU (for CT) or mean ADC counts (for MRI) histogram is constructed only for the data taken after contrast injection (i.e. no subtraction of the mean before contrast results) for a specific population. Then this histogram is used to construct the malignancy probability fraction relations exact as described below. Although the lack of subtraction reduces the accuracy of the technique, the advantages of having to only acquire one data set versus two will in some cases be preferable because of the extra simplicity of this specific embodiment. A further aspect and embodiment is the acquisition of X-ray CT or cone beam CT data sets only after contrast injection but with CT data taken with two different X-ray energy distributions. As is well-known to ones skilled-in-the-art such distributions (including specialized applications known as DXA) can be produced by varying the acceleration voltage applied to the X-ray tube with preferred example values of 120 kVp and 80 kVp (see L. Micklesfield et al, Obesity (2012) 20, 1109-1114 and its references). This has long been done to identify and display high contrast regions such as the bones in the chest. For the latter the two different distributions detect the high contrast bone materials. For the current embodiment, the high contrast detected material is the iodine contrast agent. There are at least two processes to use. One is to alternately interleave the two distributions as the CT rotation proceeds around a patient so that both a "high" and "low" CT data set is acquired with one rotation of an X-ray source and detector around the patient. Thus, both data sets (or subdata sets) are obtained in each source and detector rotation around the patient and the subtraction of the two gives the iodine concentration per voxel after appropriate calibration like described above. Two is to take one "high" data set per rotation followed by a second rotation at the "low" distribution (or vice versa) and obtain the iodine concentration from the calibrated subtraction. Both of these aspects have the significant advantage of minimizing the motion of the patient between data sets used to determine contrast concentrations, greatly simplifying the medical procedures and the automation of this process using computer controls and algorithms. It essentially eliminates the step of aligning "before" and "after" CT data set that typically are acquired three to four minutes apart when patients have often moved by 10's of mm or more. Also as well known to one skilled-in-the art, "higher" and "lower" x-ray energy distributions can also be provided by filtering the X-ray beam coming from the X-ray tube. As explained by Zentai ("Signal-to-Noise and Contrast Ratio Enhancements by Quasi-Monochromatic Imaging" IEEE Trans. On Instrumentation and Measurement March 2011, vol. 60 Issue 3. pp: 908-915.) such filters include K-edge filters consisting of iodine, cerium, neodymium europium, aluminum and copper with thickness of 2 mm or less that can be place onto a movable structure such as a rotating disk to alternatively supply the desired "high" and "low" distributions. Of course a combination of the different kVp values and filters is also very straightforward to implement.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the system and method of the present disclosure. It will be evident however to one skilled in the art that the present method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the method. The appearances of the phrase "one embodiment" in various places in the specification do not necessarily all refer to the same embodiment.

What is claimed is:

1. A method comprising:
   tabulating histogram data of malignant and benign nodules as a function of biomarker values for a specified patient population suspect of having a specific type of cancer, where biomarker values comprise mean image data values;
   separating tabulated histogram data into a plurality of biomarker bins where the bins are ranges of biomarker values;
   calculating malignancy probability fractions for each biomarker bin by dividing a number of true positives in each marker bin by a summed number of true and false positives in each biomarker bin;
   scanning a suspect nodule in a patient, and determining a characteristic biomarker value for the suspect nodule; and
   determining from the tabulated histogram data, the malignancy probability for the suspect nodule.

2. The method of claim 1, further comprising calibrating a scanning system used for scanning the suspect nodule in the patient to be substantially linear across a range of biomarker values indicating malignancy probabilities, of from 0 to 100%.

3. The method of claim 2, wherein scanning the suspect nodule in the patient, and determining the biomarker value for the suspect nodule in the patient comprises:
   performing a first computed tomographic (CT) scan of the suspect nodule;
   injecting a contrast agent comprising iodine into the patient;
   performing a second CT scan of the suspect nodule;
   determining changes in mean Hounsfield Units (HU) values for all voxels in CT images of the nodule performed before and after injection of the contrast agent; and
   interpreting the changes in mean HU values as biomarker values for the suspect nodule.

4. The method of claim 3, wherein interpreting the changes in mean HU values as biomarker values comprises interpreting the changes in mean HU values as mean Iodine concentrations ($I_c$) using calibration expressions and changes in the mean HU values from the first and second CT scans.

5. The method of claim 2, wherein scanning the suspect nodule in the patient, and determining the biomarker value for the suspect nodule in the patient comprises:
   performing a first magnetic resonance imaging (MRI) scan of the suspect nodule;
   injecting a contrast agent comprising gadolinium into the patient;
   performing a second MRI scan of the suspect nodule;
   determining changes in mean analog-to-digital (ADC) count values for all voxels in MRI images of the nodule performed before and after injection of the contrast agent; and
   interpreting the changes in mean ADC count values as biomarker values for the suspect nodule.

6. The method of claim 5, wherein interpreting the changes in mean ADC count values as biomarker values comprises interpreting the changes in mean ADC count values as mean Gd concentrations using calibration expressions and changes in the mean ADC count values from the first and second MRI scans.

7. The method of claim 5, wherein the contrast agent comprises Gadolinium-Terephthalic acid (Gd-TPA), and wherein interpreting the changes in mean ADC count values as mean GD concentrations using calibration expressions and changes in the mean ADC count values from the first and second MRI scans.

8. The method of claim 1, wherein scanning the suspect nodule in the patient, and determining the biomarker value for the suspect nodule in the patient comprises:
   injecting a contrast agent comprising iodine into the patient;
   performing an x-ray computed tomographic (CT) scans of the suspect nodule using two different X-ray energy distributions; and
   determining the mean changes in the mean Houndsfield Units (HU) for all voxels in CT images for the two different X-ray energy distributions.

9. The method of claim 8, wherein interpreting the changes in mean HU values as biomarker values comprises interpreting the changes in mean HU values as mean Iodine concentrations ($I_C$) using calibration expressions and changes in the mean HU values from the different X-ray energy distributions.

10. The method of claim 1, wherein the suspect nodule comprises a nodule in breast tissue.

11. The method of claim 1, wherein the suspect nodule comprises a nodule in lung tissue.

12. A method comprising:
   tabulating histogram data of malignant and benign nodules as a function of biomarker values for a specified patient population suspect of having a specific type of cancer to generate a measured histogram, where biomarker values comprise mean concentrations of a contrast agent in the nodules;
   generating a Gaussian approximated histogram of the measured histogram;
   generating from the Gaussian approximated histogram and the biomarker values a malignancy probability diagram that represents a probability that a suspect nodule having a specified biomarker value would be found to be malignant if biopsied;
   scanning a suspect nodule in a patient, and determining a biomarker value for the suspect nodule; and
   determining from the malignancy probability diagram a malignancy probability for the suspect nodule.

13. The method of claim 12, further comprising calibrating a scanning system used for scanning the suspect nodule in the patient to be substantially linear across a range of biomarker values indicating malignancy probabilities of from 0 to 100%.

14. The method of claim 13, wherein scanning the suspect nodule in the patient, and determining the biomarker value for the suspect nodule in the patient comprises:
   performing a first computed tomographic (CT) scan of the suspect nodule;
   injecting a contrast agent comprising iodine into the patient;
   performing a second CT scan of the suspect nodule;
   determining changes in mean Hounsfield Units (HU) values for all voxels in CT images of the nodule performed before and after injection of the contrast agent; and
   interpreting the changes in mean HU values as biomarker values for the suspect nodule.

15. The method of claim 14, wherein interpreting the changes in mean HU values as biomarker values comprises interpreting the changes in mean HU values as mean Iodine concentrations ($I_c$) using calibration expressions and changes in the mean HU values from the first and second CT scans.

16. The method of claim 13, wherein scanning the suspect nodule in the patient, and determining the biomarker value for the suspect nodule in the patient comprises:
   performing a first magnetic resonance imaging (MRI) scan of the suspect nodule;
   injecting a contrast agent comprising gadolinium into the patient;
   performing a second MRI scan of the suspect nodule;
   determining mean analog-to-digital (ADC) count values for all voxels in a MRI image of the suspect nodule; and
   interpreting the mean ADC count values as biomarker values that correspond one-to-one to a malignancy probability for the suspect nodule.

17. The method of claim 16, wherein interpreting the mean Gd concentration values as biomarker values comprises using Gd concentration calibration expressions from changes in the mean ADC count values from the first and second MRI scans.

18. The method of claim 16, wherein the contrast agent comprises Gadolinium-Terephthalic acid (Gd-TPA), and wherein interpreting the mean Gd concentration values as biomarker values comprises interpreting changes in mean ADC counts from the MRI data sets for each of the nodules.

19. The method of claim 12, wherein scanning the suspect nodule in the patient, and determining the biomarker value for the suspect nodule in the patient comprises:
   injecting a contrast agent comprising iodine into the patient;
   performing an x-ray computed tomographic (CT) scan of the suspect nodule; and
   determining the mean Iodine concentrations ($I_c$) for all voxels in CT images of the nodule performed after injection of the contrast agent from the changes in mean HU values for the different X-ray energy distribution data acquisitions.

20. The method of claim 12, wherein scanning the suspect nodule in the patient comprises injecting a contrast agent comprising Iodine, and performing an x-ray computed tomographic (CT) scan of the suspect nodule, and wherein determining the biomarker value for the suspect nodule in the patient comprises obtaining mean iodine concentrations after iodine contrast injection via different X-ray energy distribution data acquisitions.

* * * * *